United States Patent
Yoshida

(10) Patent No.: US 9,873,263 B2
(45) Date of Patent: Jan. 23, 2018

(54) PRINT PROCESSING PROGRAM FOR COORDINATING PRINTER MODE WITH USER TYPE

(71) Applicant: Brother Kogyo Kabushiki Kaisha, Nagoya-shi, Aichi-ken (JP)

(72) Inventor: Junjiro Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/328,743

(22) Filed: Jul. 11, 2014

(65) Prior Publication Data
US 2015/0015899 A1    Jan. 15, 2015

(30) Foreign Application Priority Data
Jul. 12, 2013  (JP) .................. 2013-146887

(51) Int. Cl.
*G06K 15/10* (2006.01)
*G06F 3/12* (2006.01)
(Continued)

(52) U.S. Cl.
CPC .............. *B41J 3/46* (2013.01); *G06F 3/1204* (2013.01); *G06F 3/1229* (2013.01); *G06F 3/1236* (2013.01); *G06F 3/1284* (2013.01)

(58) Field of Classification Search
CPC ............ H04N 1/00278; H04N 1/00204; G06F 9/4415; G06F 9/4411; G06F 9/4413;
(Continued)

(56) References Cited

U.S. PATENT DOCUMENTS 7,804,520 B2   9/2010  Suehiro
8,085,414 B2 * 12/2011  Ishikawa ............ H04N 1/00347
                                                        358/1.13
(Continued)

FOREIGN PATENT DOCUMENTS

JP    S62125432 A    6/1987
JP    H01269565 A    10/1989
(Continued)

OTHER PUBLICATIONS

Mar. 3, 2017 (JP)—Notice of Reasons for Rejection—App 2013-146887.

*Primary Examiner* — Chad Dickerson
(74) *Attorney, Agent, or Firm* — Banner & Witcoff, Ltd.

(57) ABSTRACT

This disclosure discloses a non-transitory computer-readable recording medium storing a printing processing program. The program executes steps on a computing device disposed on an operation terminal. The operation terminal recognizes the printing apparatus as a storage device or a printing device when the printing apparatus is in a storage device mode or the printing device mode. The steps includes a selection receiving, an off-line determining, a connection determining, and a switching outputting. In a selection receiving, a selection of specific the printing apparatus is received. In an off-line determining, it is determined whether or not the specific printing apparatus is in an off-line state. In a connection determining, it is determined whether or not the specific printing apparatus is connected as the storage device. In a switching outputting, the mode switching signal is outputted.

6 Claims, 20 Drawing Sheets

(51) Int. Cl.
*B41J 3/46* (2006.01)
*G06F 3/00* (2006.01)

(58) Field of Classification Search
CPC .... G06F 3/1204; G06F 3/1225; G06F 3/1284; G06F 3/1229; G06F 3/1236; G06K 15/021; G06K 15/022; B41J 3/46; B41J 3/4075
USPC ......... 358/1.6, 1.2, 443, 444, 448, 449, 452, 358/451, 468, 305, 1.11–1.18, 1.1, 1.8, 358/1.9, 2.1; 399/38, 82–86; 709/212, 709/220, 230, 232; 715/225, 744, 746, 715/764, 866; 400/81
See application file for complete search history.

(56) References Cited

U.S. PATENT DOCUMENTS

| | | | | |
|---|---|---|---|---|
| 8,149,453 | B2* | 4/2012 | Tanaka et al. | 358/1.2 |
| 8,161,213 | B2* | 4/2012 | Kadota | G06F 3/1204 710/62 |
| 8,179,554 | B2 | 5/2012 | Kato et al. | |
| 8,289,548 | B2 | 10/2012 | Kato et al. | |
| 8,307,280 | B2* | 11/2012 | Nose | G06F 17/211 715/243 |
| 8,477,358 | B2* | 7/2013 | Sugimura | G06F 3/1204 358/1.13 |
| 8,493,576 | B2* | 7/2013 | Enomoto | H04N 1/00347 358/1.13 |
| 8,619,292 | B2 | 12/2013 | Maekawa | |
| 8,717,599 | B2 | 5/2014 | Ochiai et al. | |
| 8,810,822 | B2* | 8/2014 | Tomomatsu | H04N 1/00278 358/1.13 |
| 2004/0090543 | A1 | 5/2004 | Suehiro | |
| 2005/0018240 | A1* | 1/2005 | Shima | H04N 1/00278 358/1.15 |
| 2005/0223323 | A1* | 10/2005 | Tanaka | G06F 17/211 715/273 |
| 2007/0013781 | A1* | 1/2007 | Kageyama | H04N 5/232 348/207.2 |
| 2007/0139684 | A1* | 6/2007 | Shima | G06K 15/00 358/1.13 |
| 2009/0109486 | A1 | 4/2009 | Kato et al. | |
| 2009/0273803 | A1 | 11/2009 | Sugimura et al. | |
| 2011/0038005 | A1 | 2/2011 | Ochiai et al. | |
| 2011/0075203 | A1* | 3/2011 | Maekawa | G06F 3/1205 358/1.15 |
| 2013/0038888 | A1* | 2/2013 | Leeuwen | G06F 3/1204 358/1.13 |

FOREIGN PATENT DOCUMENTS

| | | |
|---|---|---|
| JP | H10-322504 A | 12/1998 |
| JP | 2004-157647 A | 6/2004 |
| JP | 2004362330 A | 12/2004 |
| JP | 2006305938 A | 11/2006 |
| JP | 2009-101608 A | 5/2009 |
| JP | 2009-223874 A | 10/2009 |
| JP | 2009266179 A | 11/2009 |
| JP | 2010-055447 A | 3/2010 |
| JP | 2010-113702 A | 5/2010 |
| JP | 2011076171 A | 4/2011 |
| JP | 2013-010222 A | 1/2013 |
| JP | 2013003645 A | 1/2013 |

* cited by examiner

[FIG. 1]
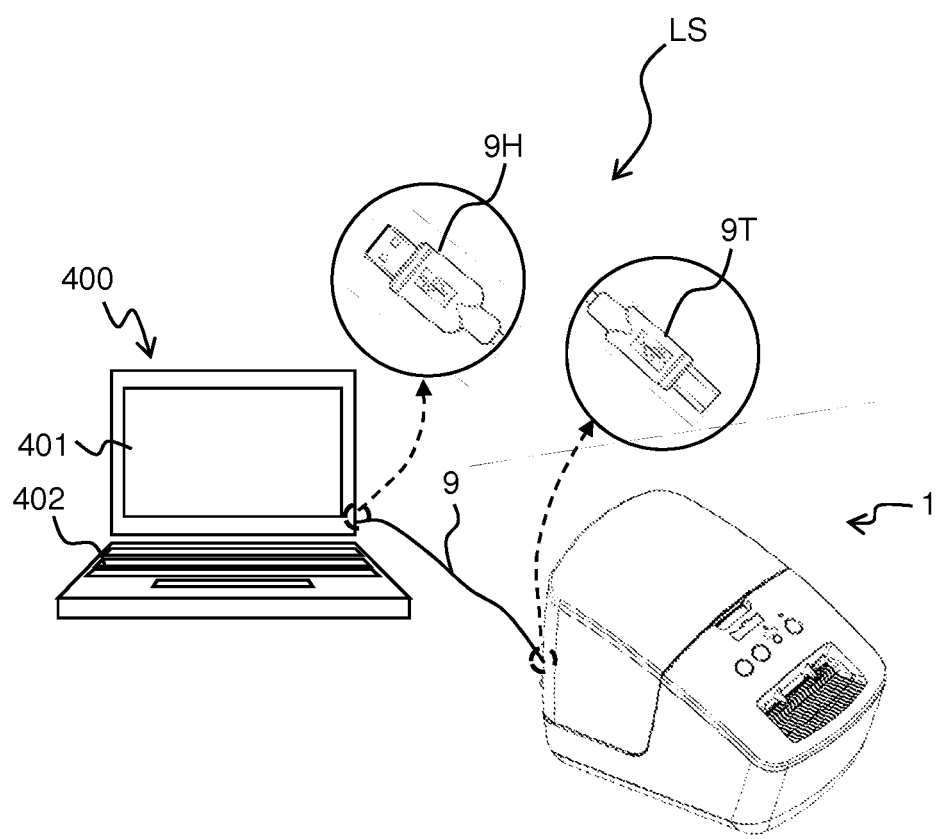

[FIG. 2]
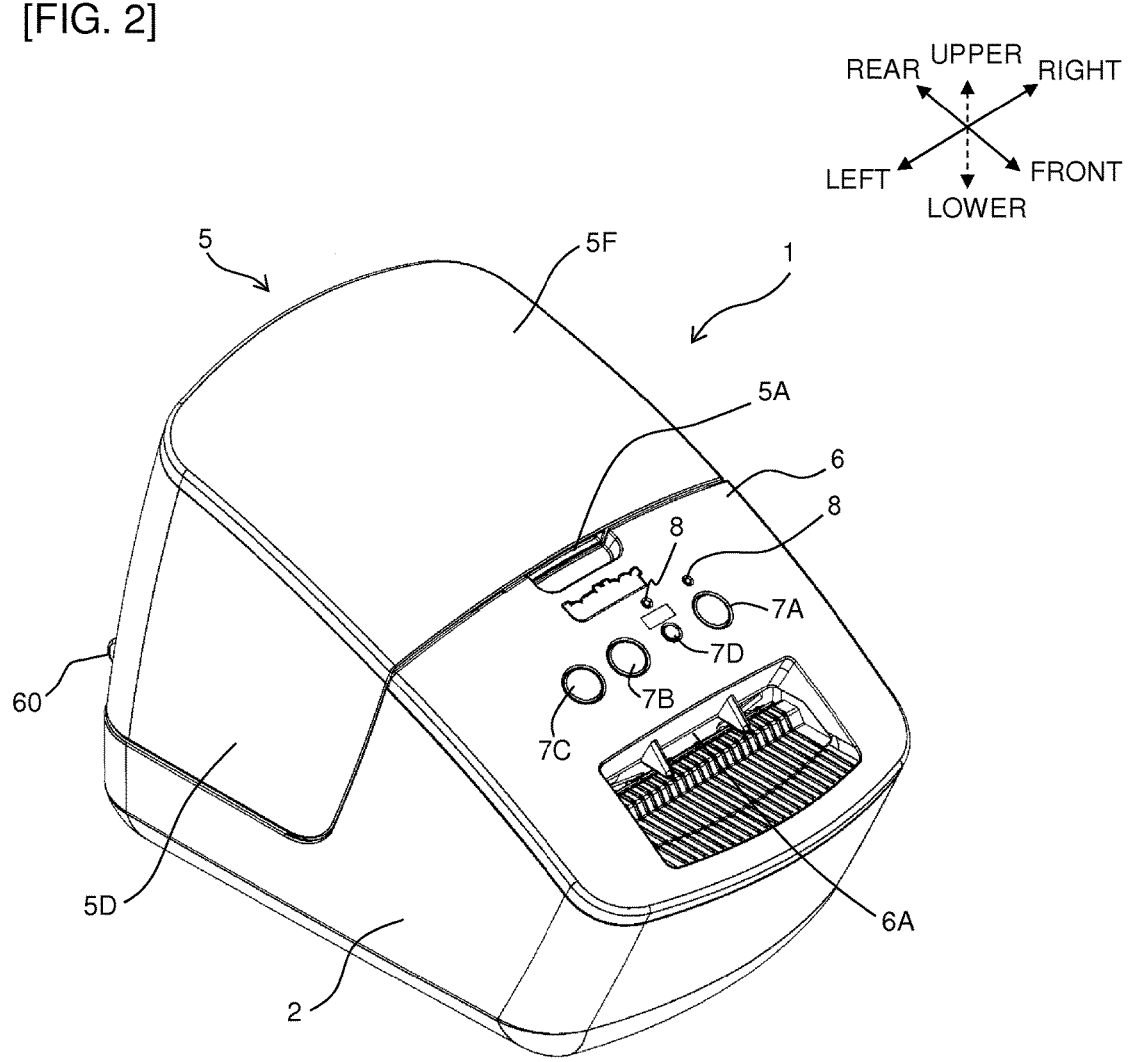

[FIG. 3]
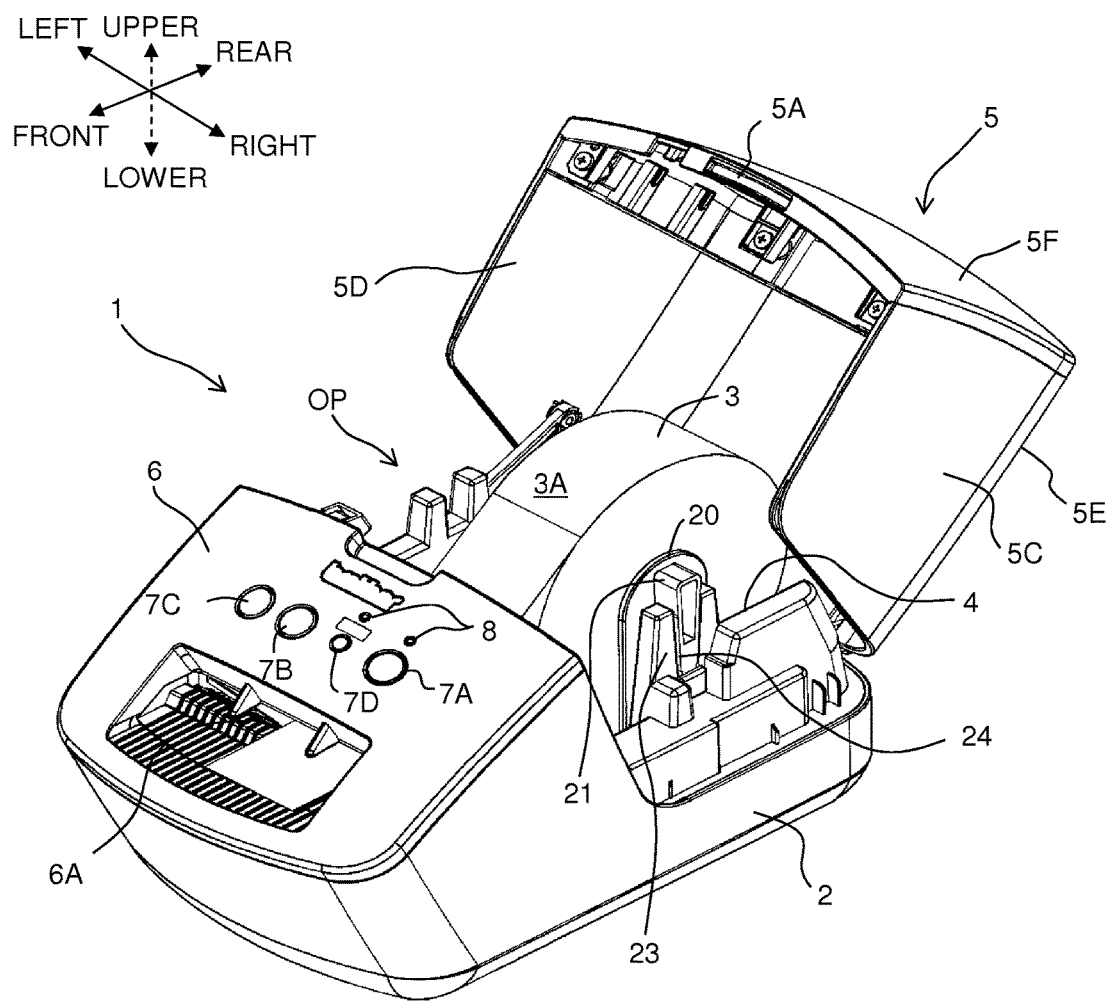

[FIG. 4]
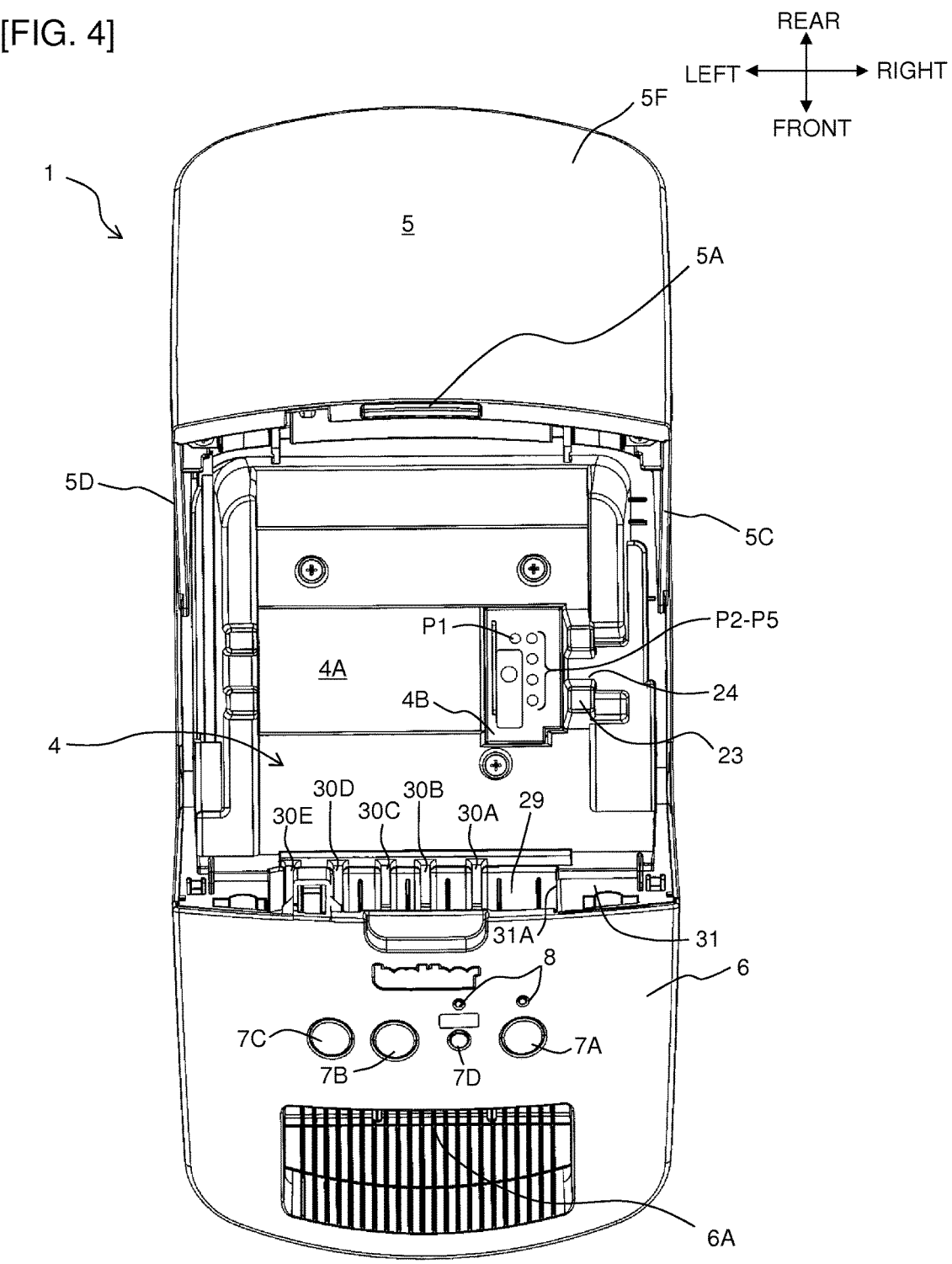

[FIG. 5]
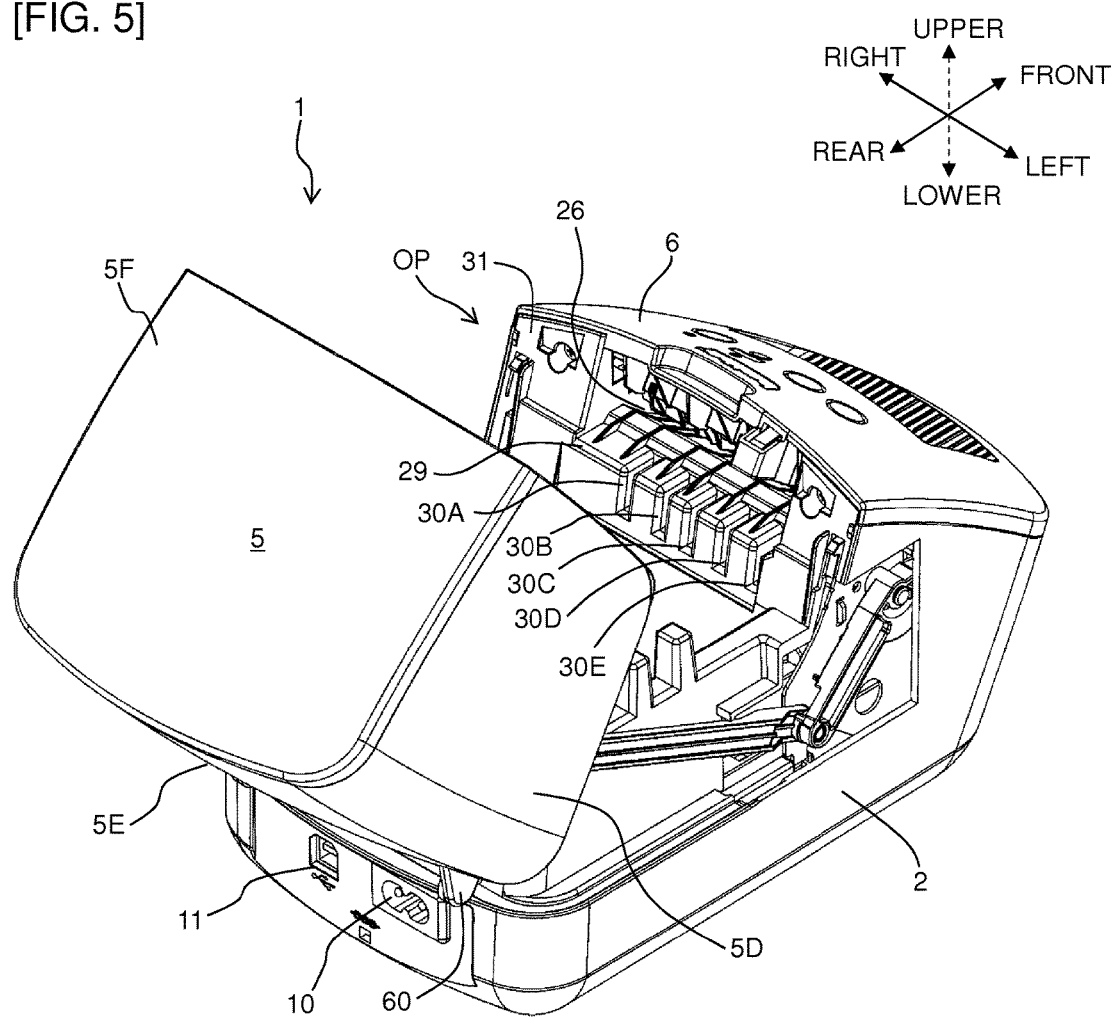

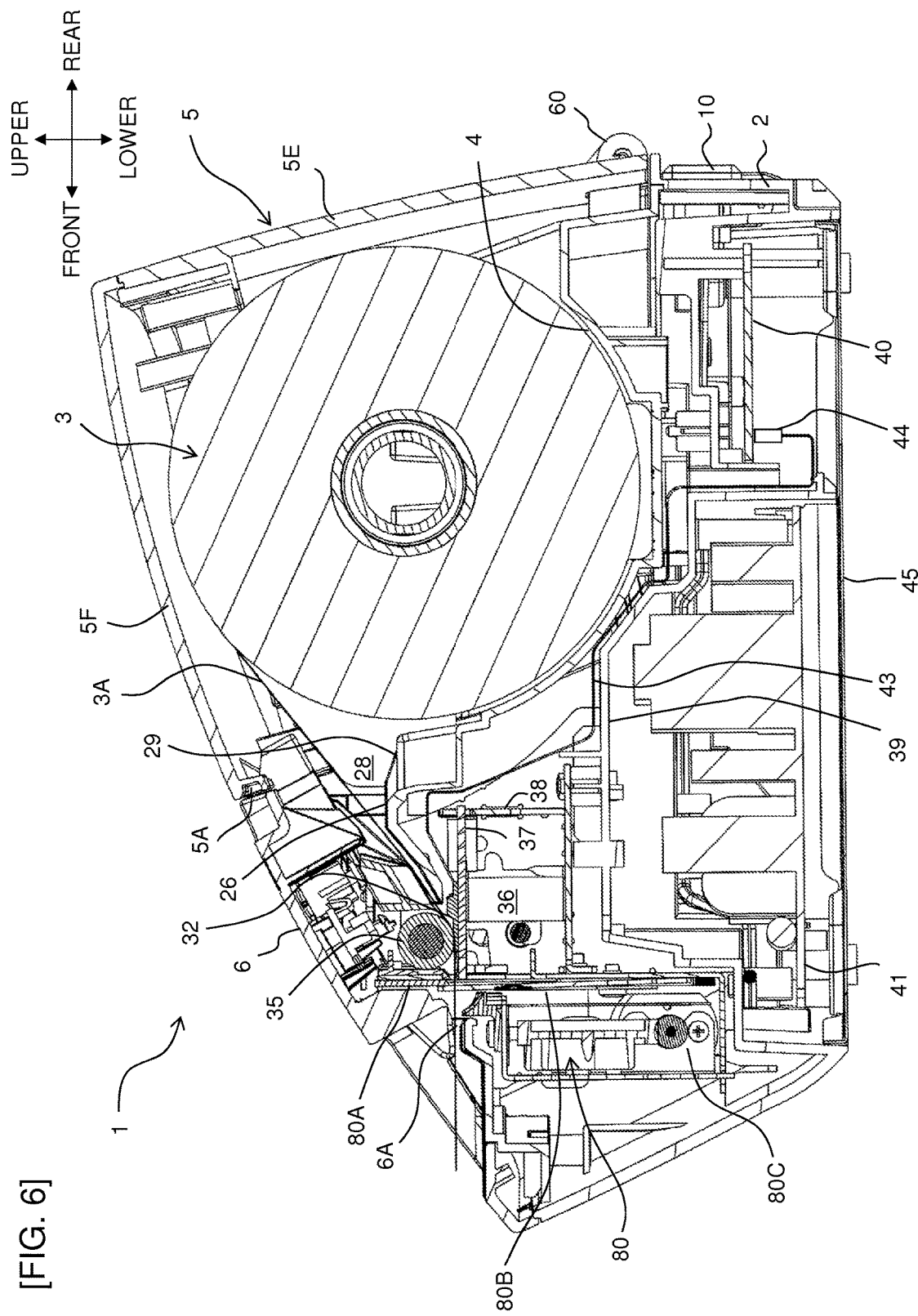

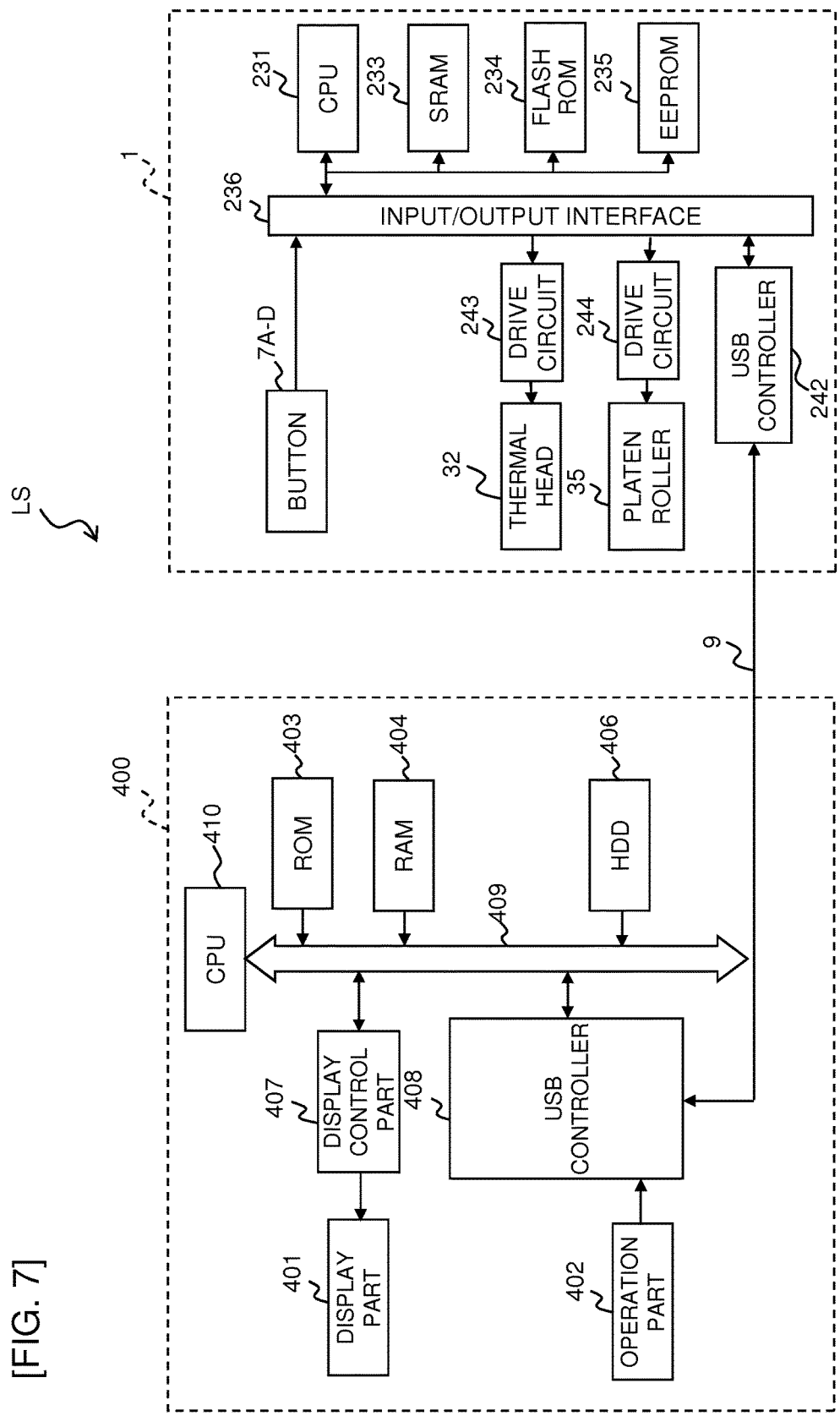

[FIG. 8]
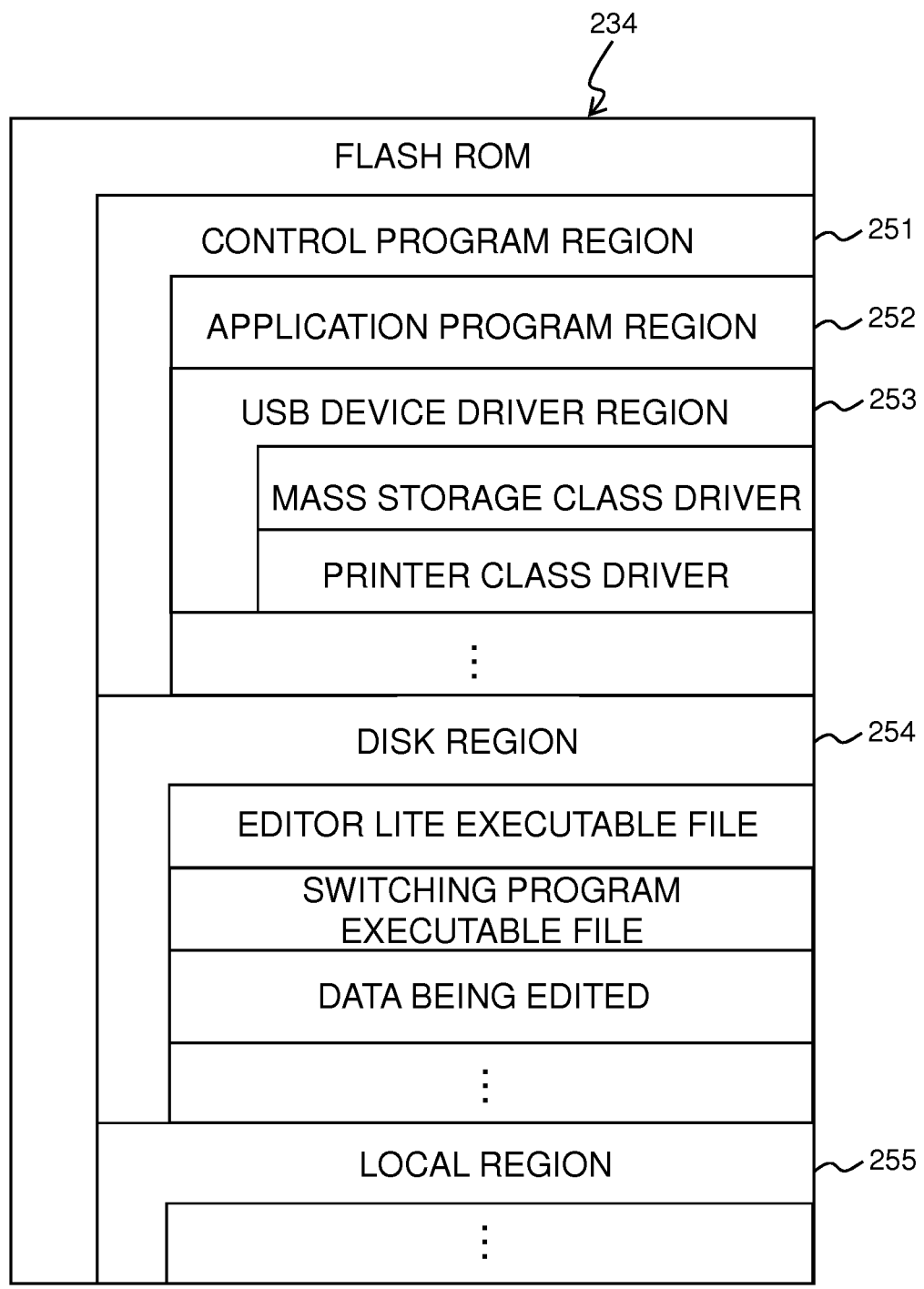

[FIG. 9]
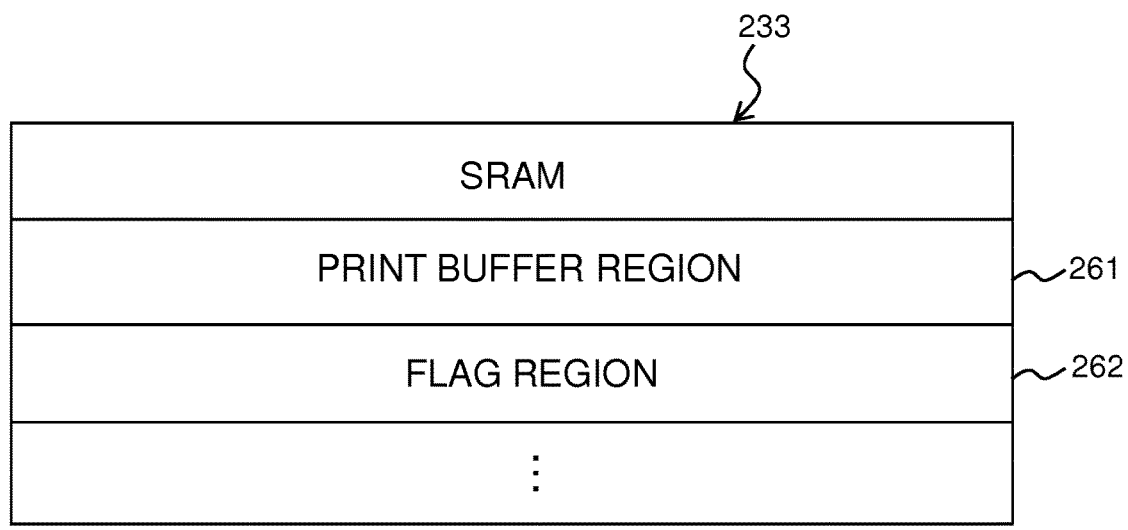

[FIG. 10]
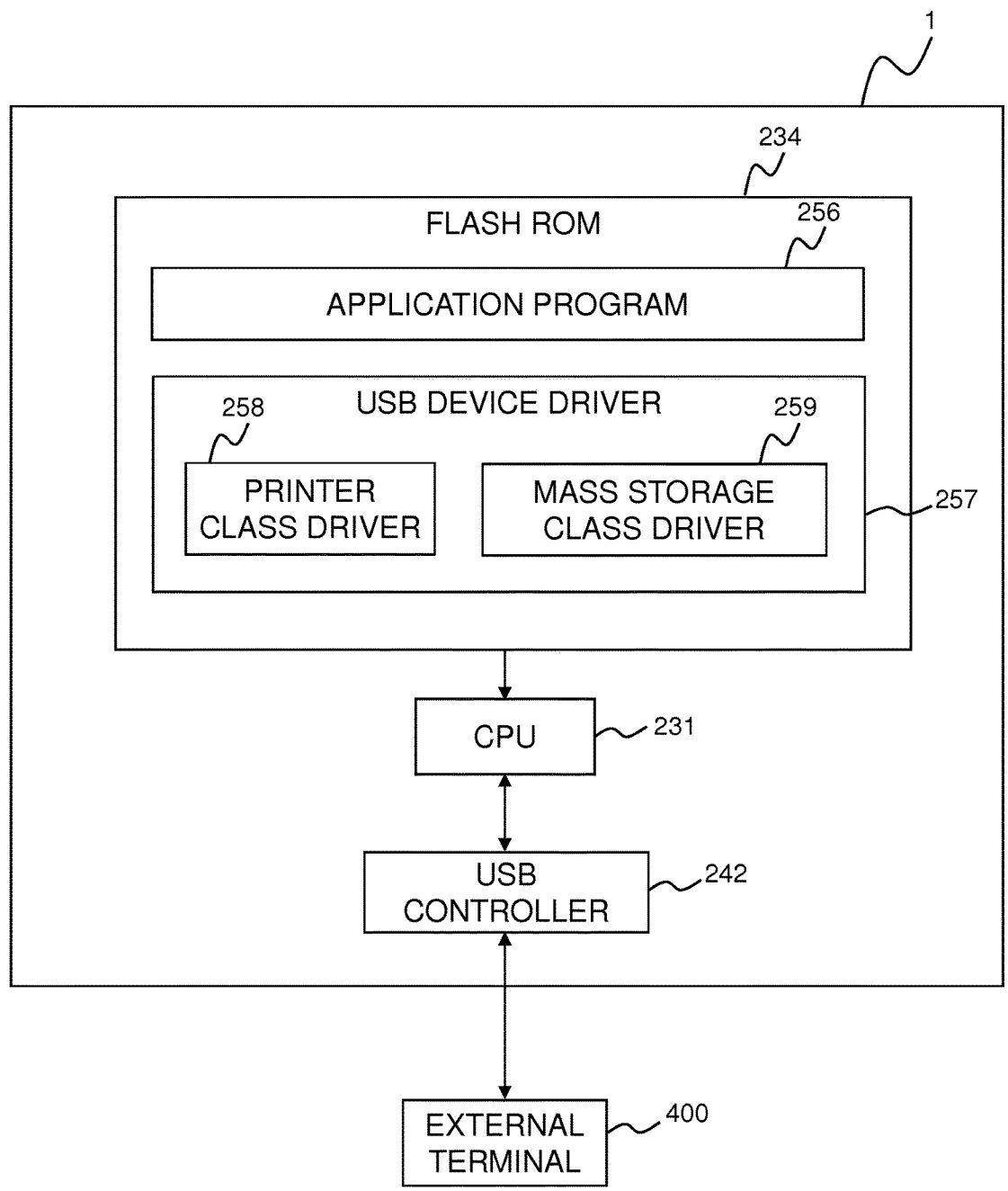

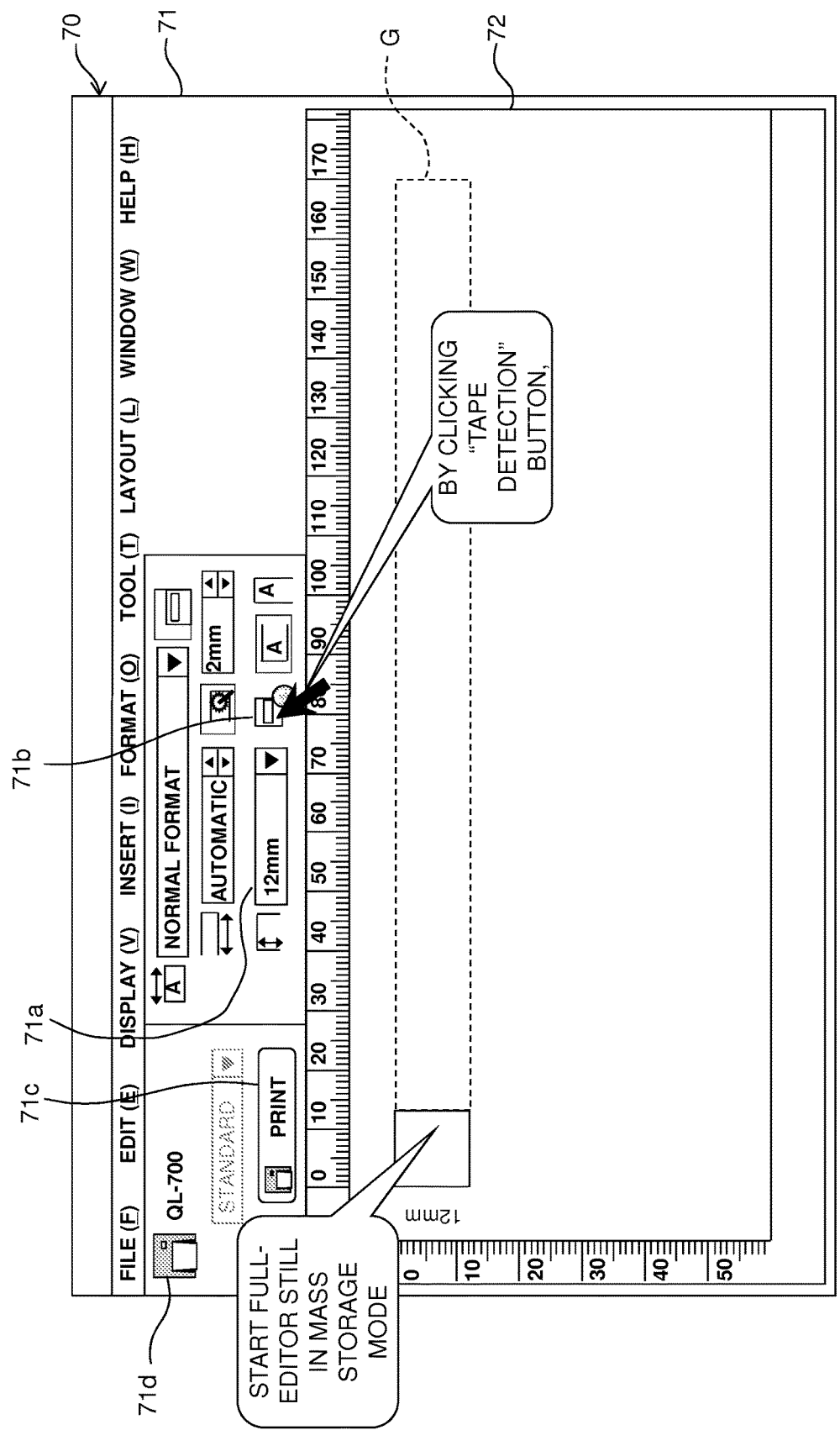

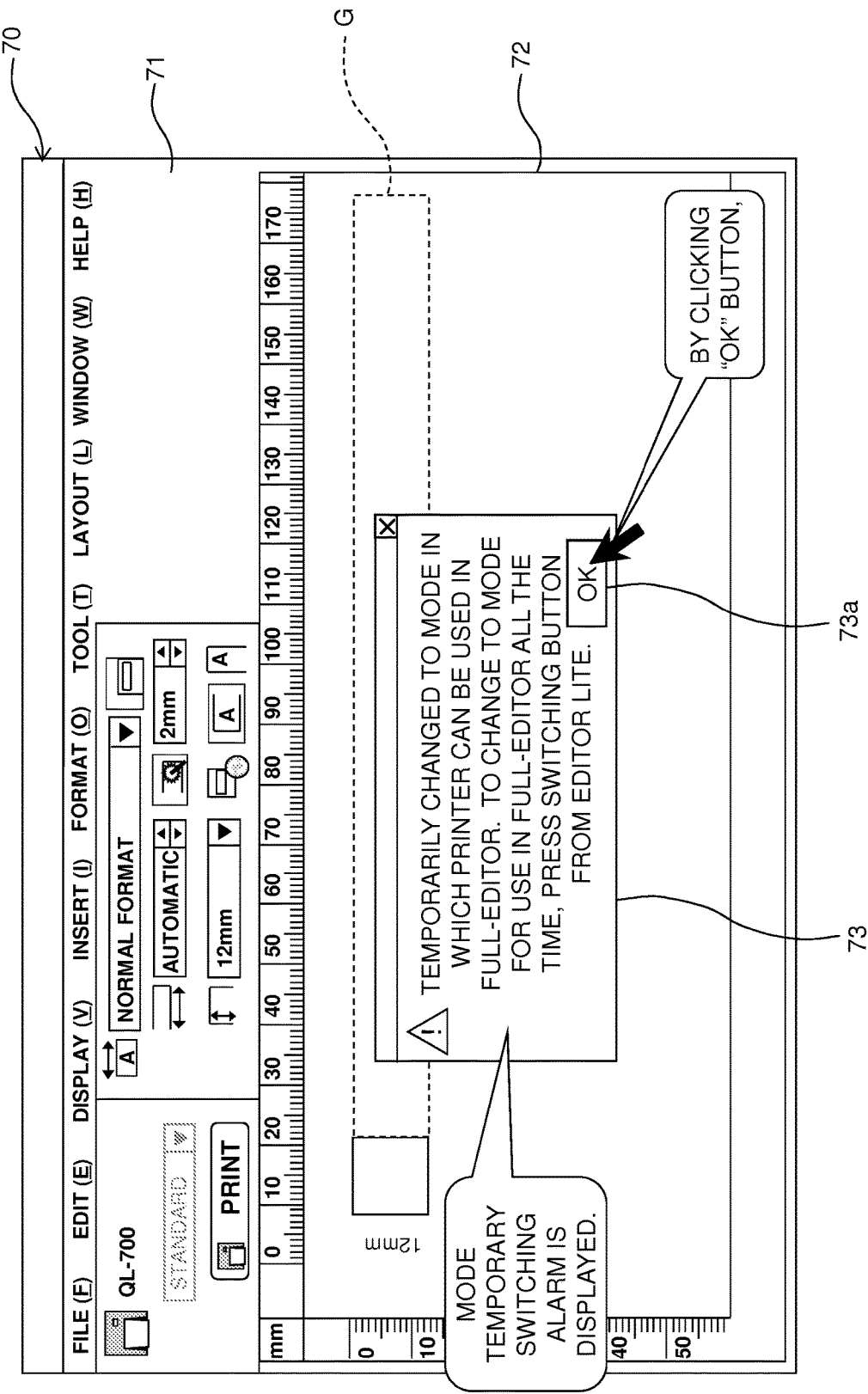

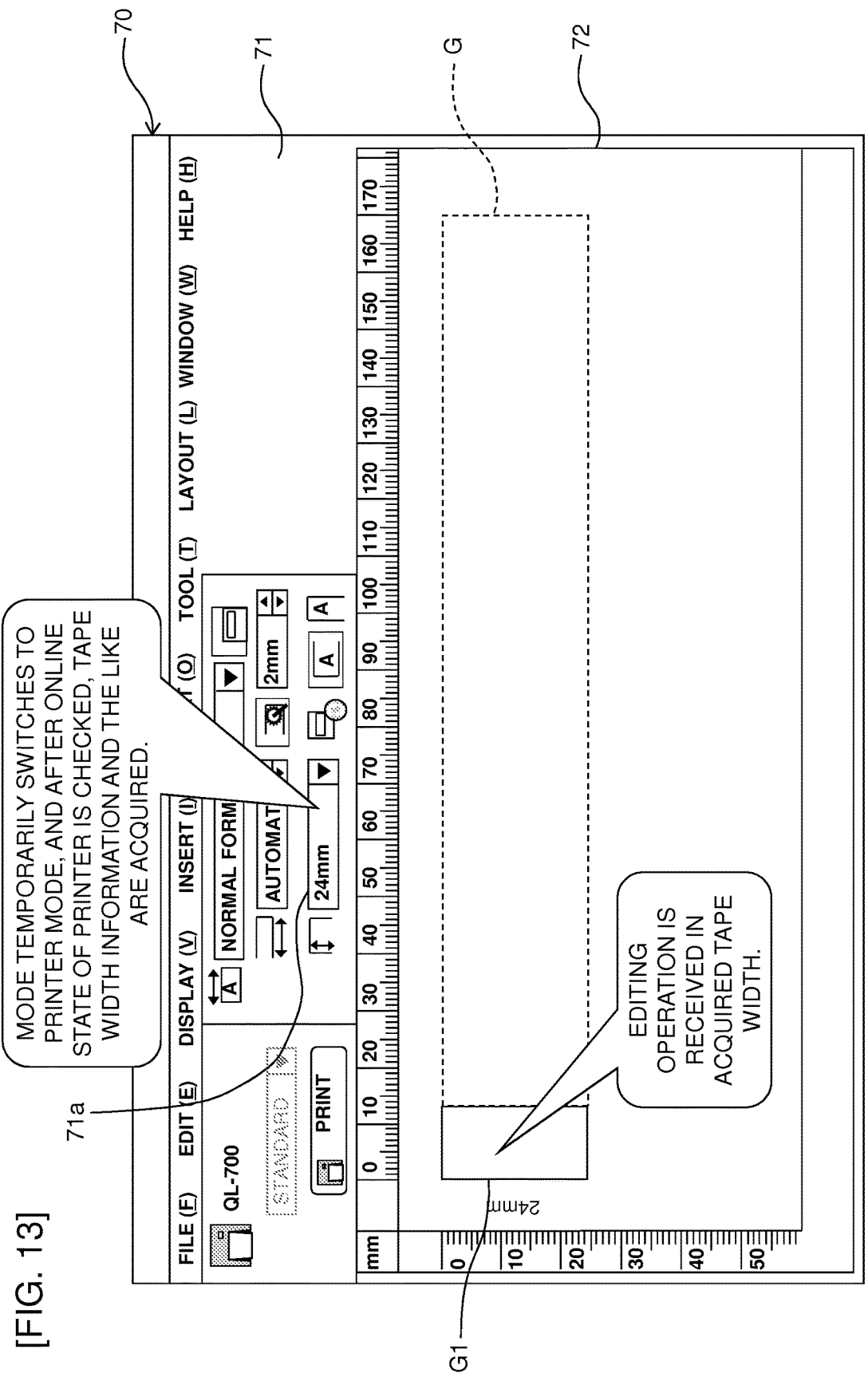

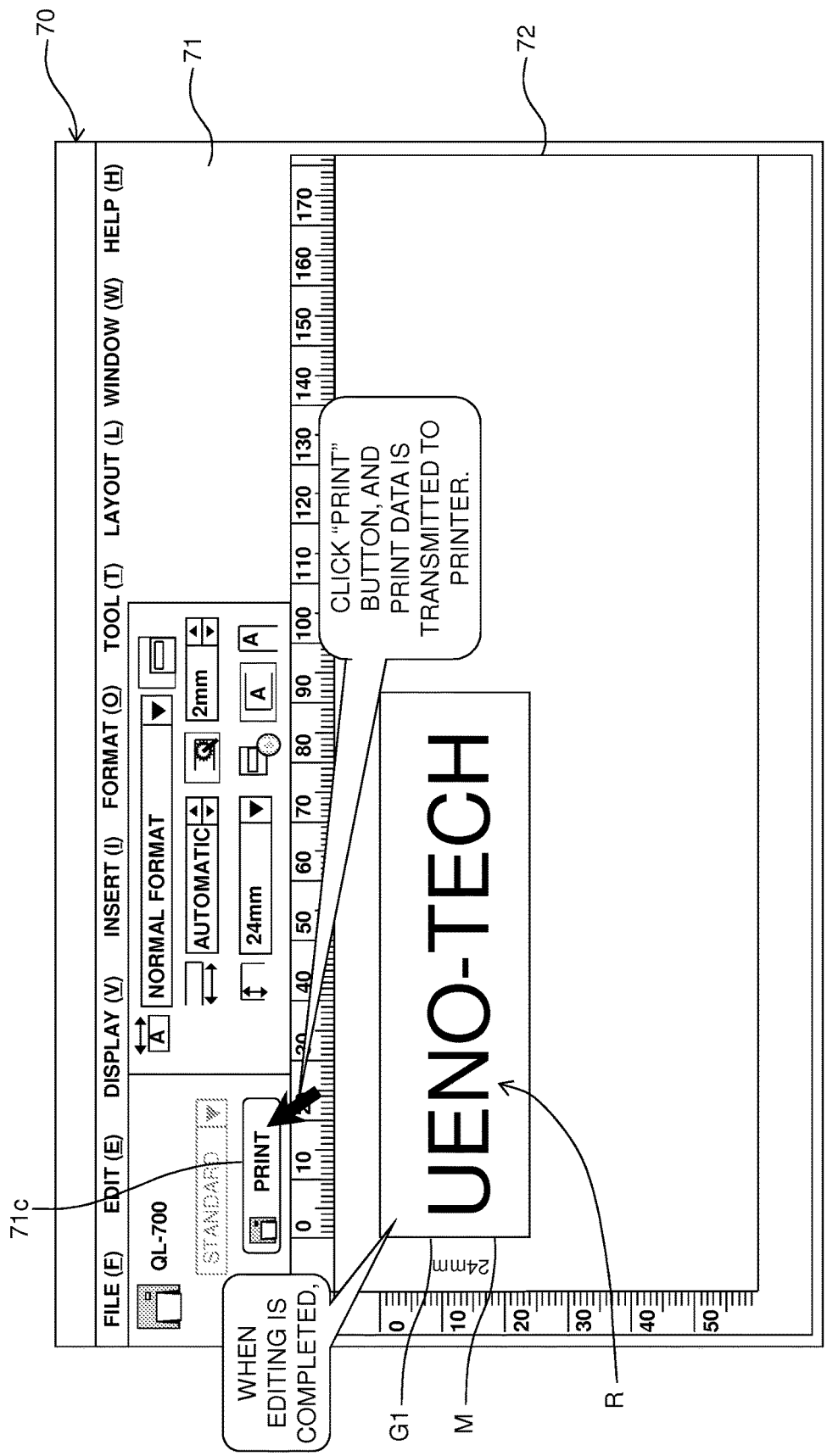

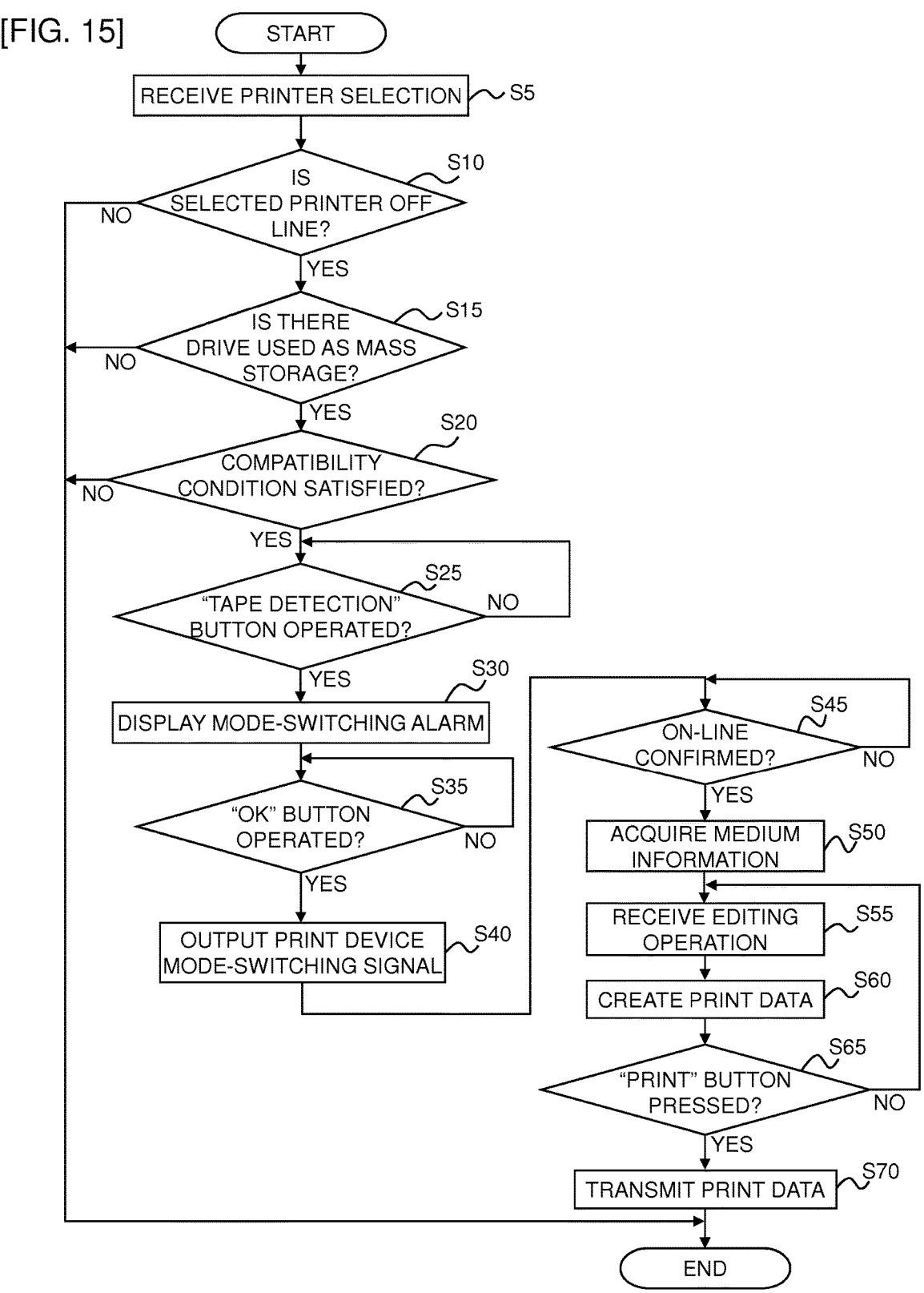

[FIG. 16]
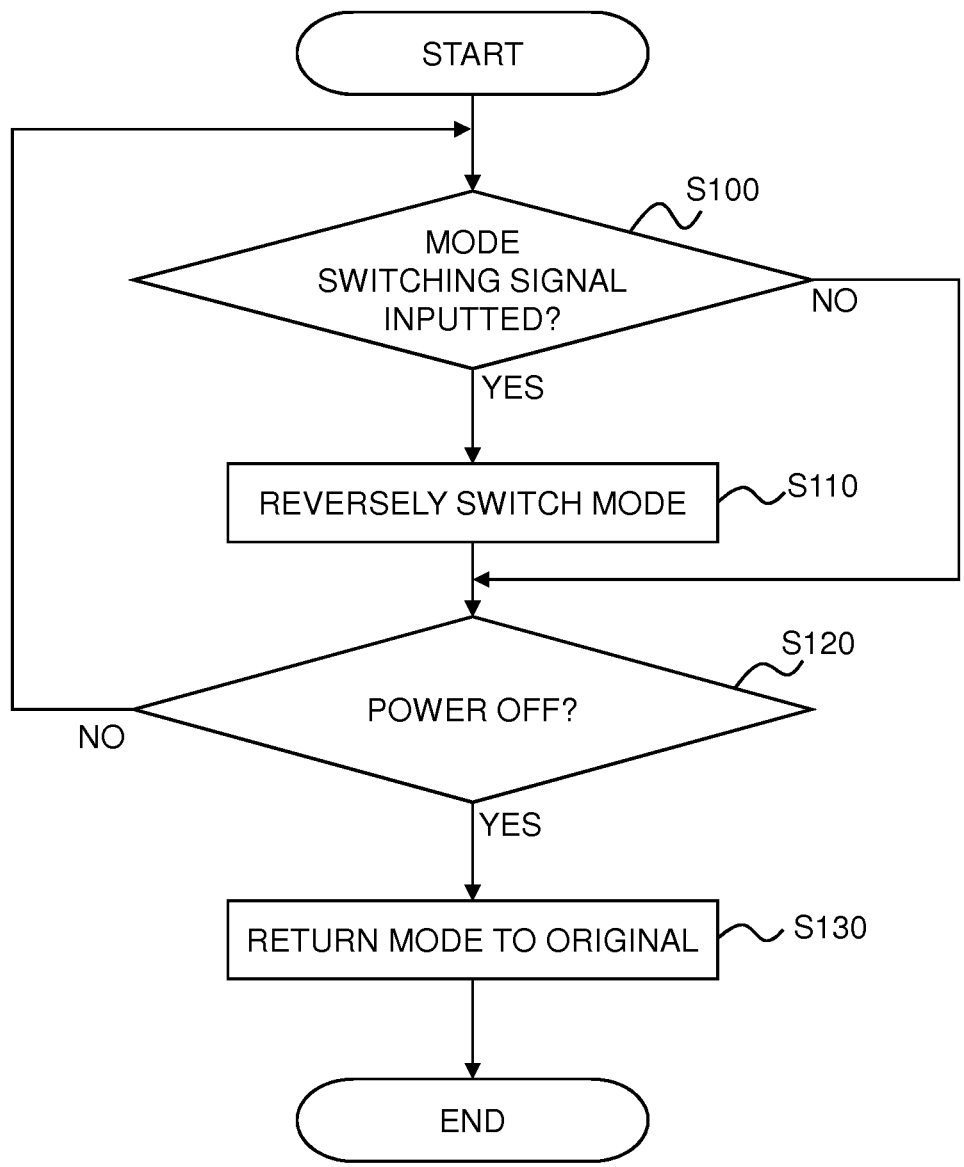

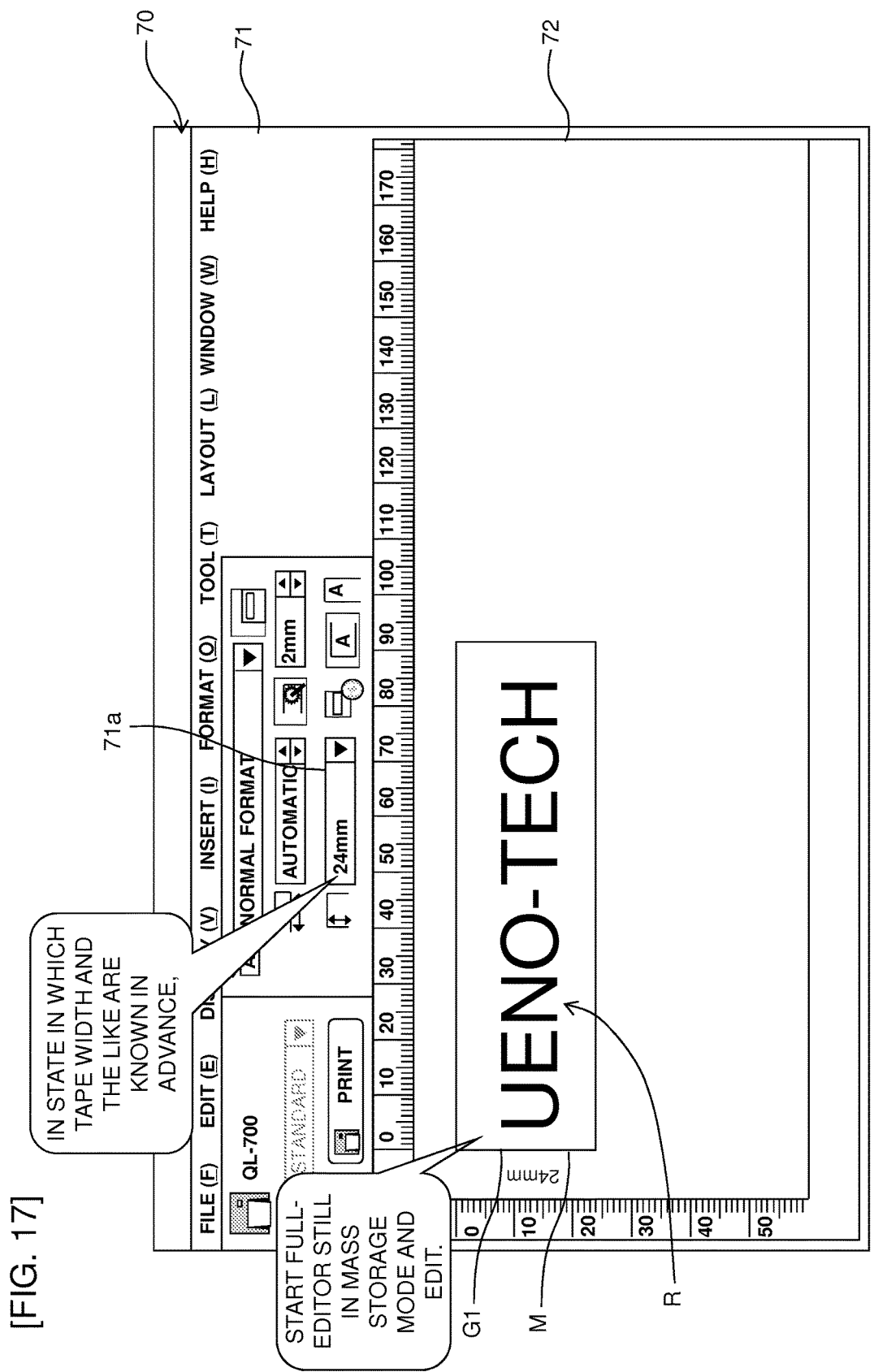
[FIG. 17]

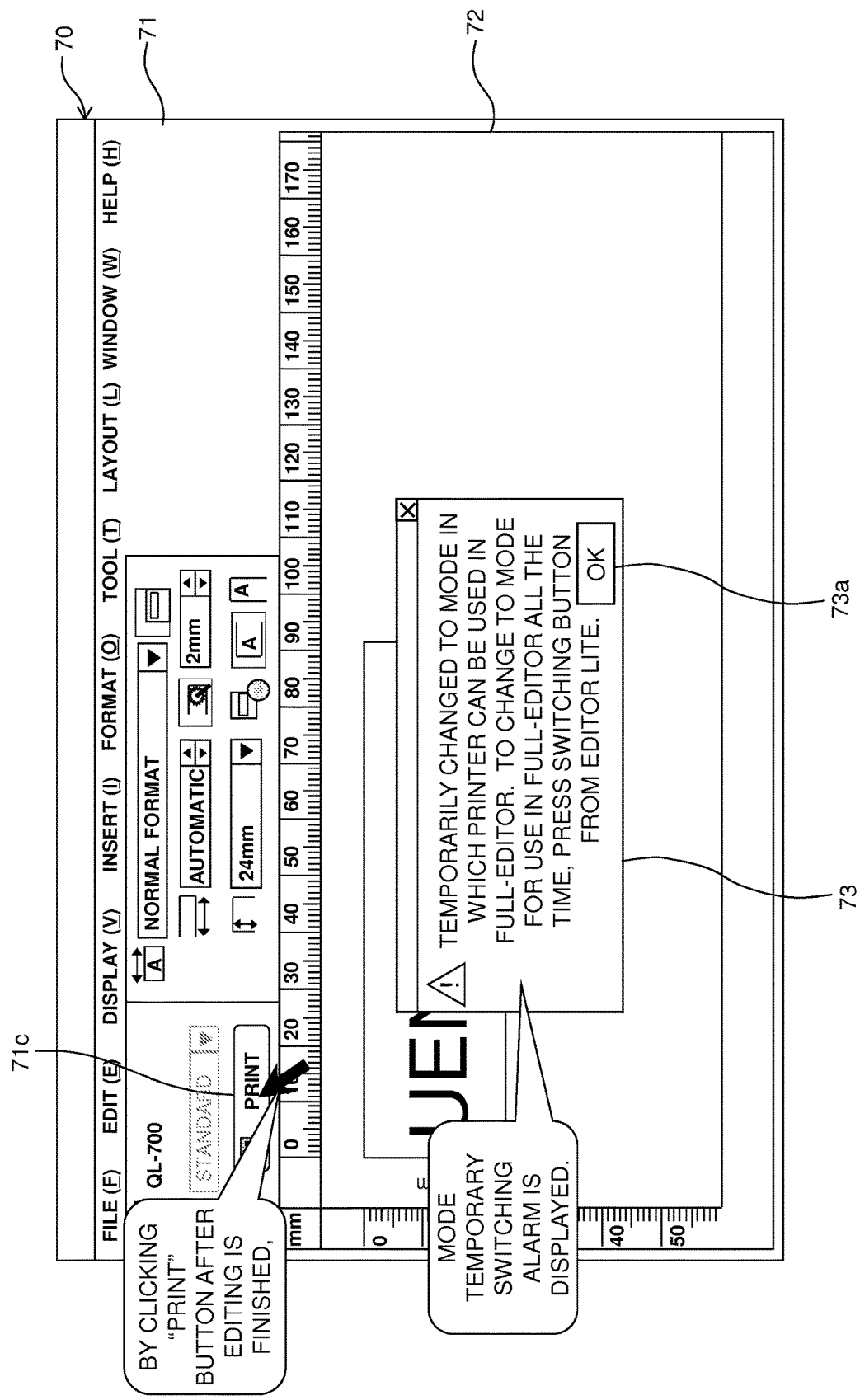
[FIG. 18]

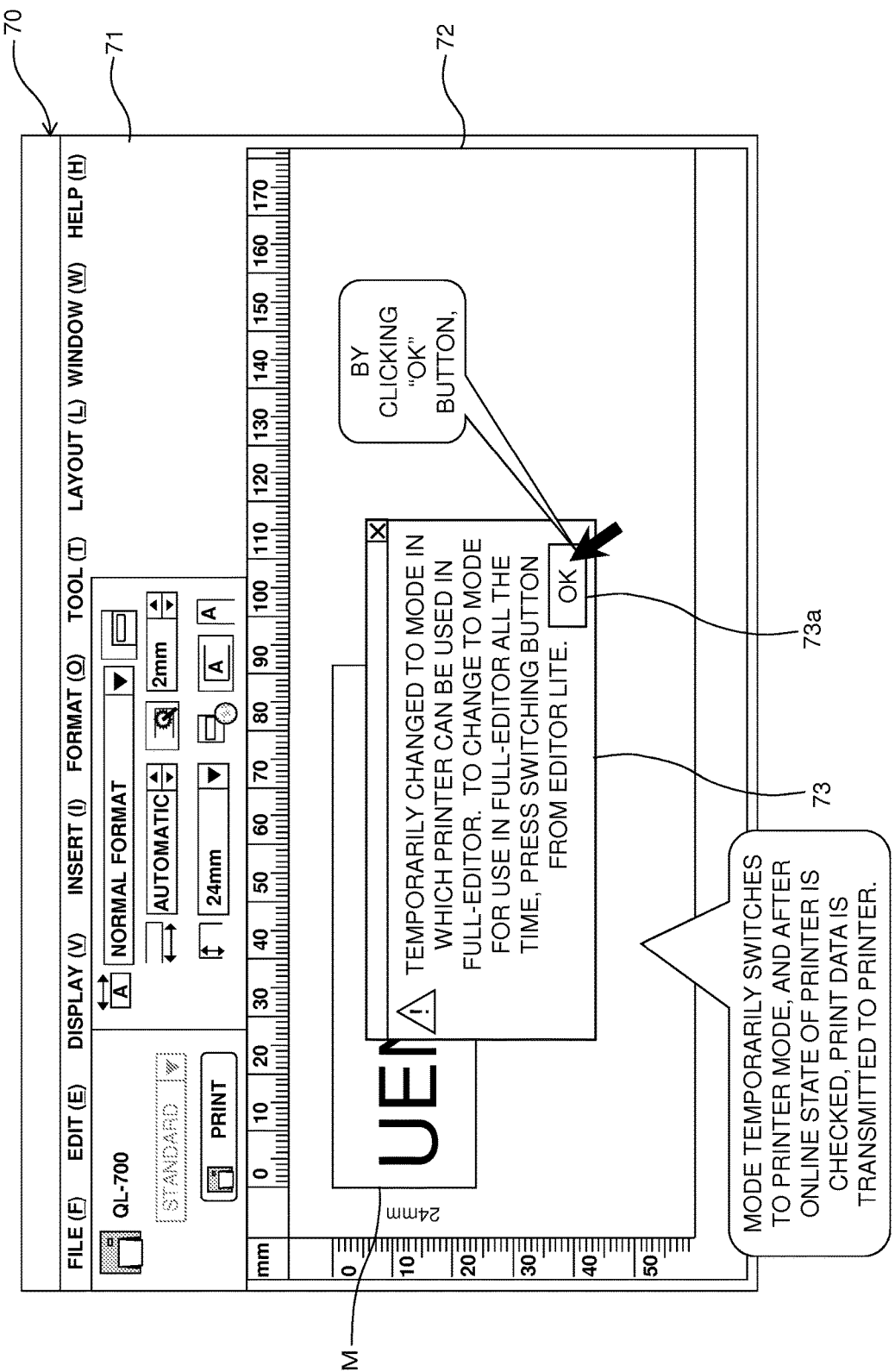

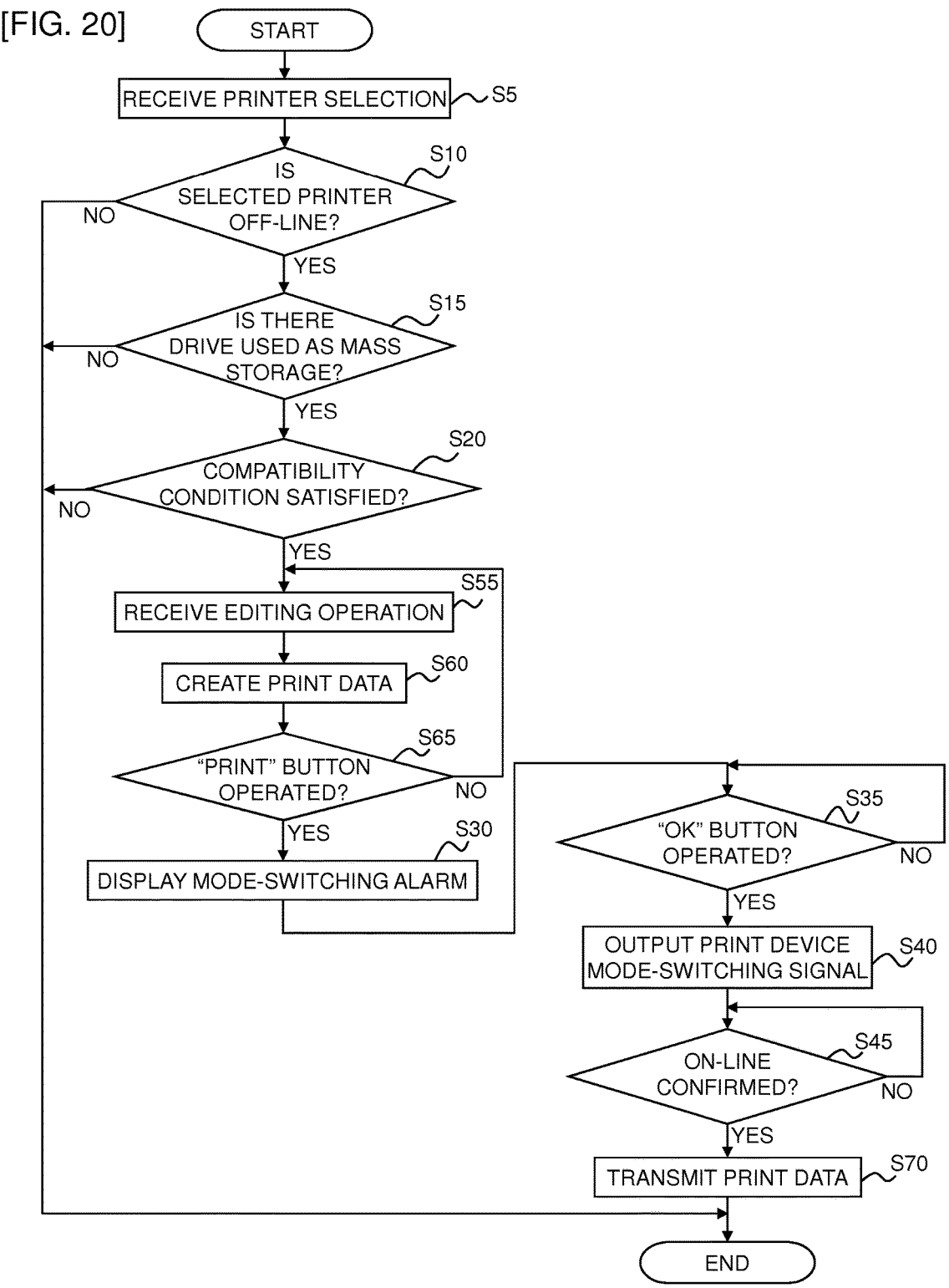

PRINT PROCESSING PROGRAM FOR COORDINATING PRINTER MODE WITH USER TYPE

CROSS-REFERENCE TO RELATED APPLICATION

The present application claims priority from Japanese Patent Application No. 2013-146887, which was filed on Jul. 12, 2013, the disclosure of which is incorporated herein by reference in its entirety.

BACKGROUND

Field

The present disclosure relates to a recording medium which stores a printing processing program for controlling a printing apparatus.

Description of the Related Art

A configuration for performing printing by operating a printing apparatus from an operation terminal has been already known. In the prior art, either one of a storage device mode and a printing device mode is selectively executed as a driving mode in a printing apparatus to be operated. If the driving mode is the printing device mode, the operating terminal recognizes the printing apparatus as a printing device. In the case, print data is created in the operation terminal for forming a desired print by using an application program for the printing device, and print formation processing can be executed by transferring the print data to the printing apparatus. Therefore, the printing device mode is more convenient for a user (hereinafter referred to as an "ordinary user" as appropriate) who wants to perform print formation in a desired intended aspect with high accuracy even if the operation is somewhat complicated or cumbersome.

On the other hand, if the driving mode is the storage device mode, the operation terminal recognizes the printing apparatus as a storage device. In the case, an executable file of an editing program of the print data stored in the printing apparatus can be easily used from the operation terminal without installing the editing program of the print data in advance in the operation terminal. Particularly, since various types of data can be easily stored in the printing apparatus from the operation terminal, the print processing can be executed by the printing apparatus by storing the print data directly in the printing apparatus without installing a printer driver in the operation terminal in advance. Therefore, the storage device mode is more convenient for a user (hereinafter referred to as a "casual user" as appropriate) who wants to perform print formation casually and rapidly with a simple operation even if a print aspect or an editing operation is somewhat limited.

In the above described prior art, the ordinary user and the casual user might share the same printing apparatus for use in some cases. In such a case, for example, if the ordinary user (who usually uses the printing apparatus in the printing device mode) erroneously uses the application program for printing with respect to the printing apparatus in the storage device mode in order to create print data and perform print formation, it is likely that print formation is not performed correctly. On the contrary, for example, if the casual user (who usually uses the printing apparatus in the storage device mode) erroneously connects the printing apparatus in the printing device mode to the operation terminal without change, plug-and-play of the printing apparatus is started, and it is likely that the casual user is confused.

SUMMARY

An object of the present disclosure is to provide a recording medium which stores a printing processing program which enables the ordinary user and the casual user to smoothly share the same printing apparatus.

In order to achieve the above-described object, according to the aspect of the present application, there is provided a non-transitory computer-readable recording medium storing a printing processing program for executing steps on a computing device disposed on an operation terminal that is connected to a printing apparatus comprising a printing head configured to print print data on a print-receiving medium and configured to selectively switch either one of driving modes between a storage device mode and a printing device mode in accordance with an input of a mode switching signal and is configured to recognize the printing apparatus as a storage device when the printing apparatus is in the storage device mode and to recognize the printing apparatus as a printing device when the printing apparatus is in the printing device mode, the printing processing program for controlling the printing apparatus in the printing device mode, the steps comprising a selection receiving that receives a selection of specific the printing apparatus to be operated, an off-line determining that determines whether or not the specific printing apparatus that is selected in the selection receiving is in an off-line state, a connection determining that determines whether or not the specific printing apparatus is connected to the operation terminal as the storage device when the specific printing apparatus is determined to be in the off-line state in the off-line determining, and a switching outputting that outputs the mode switching signal to the printing apparatus according to the condition that it is determined that the specific printing apparatus is connected to the operation terminal as the storage device, in the connection determining.

In the printing apparatus to be operated of the present disclosure, in order to enable smooth sharing by the ordinary user and the casual user, a function of switching the printing apparatus to the printing device mode is added to the printing processing program for controlling the printing apparatus in the printing device mode on the premise that the printing apparatus is basically in the storage device mode.

That is, when the printing processing program is executed, first, in a selection receiving, selection of a specific printing apparatus to be operated is received. When the user (since the program is a program for printing apparatus in the printing device mode, the user when the program is executed is the above described ordinary user) selects the printing apparatus, it is determined in an off-line determining whether the selected specific printing apparatus is in an off-line state or not. If the specific printing apparatus is in the storage device mode as the result of the above, the specific printing apparatus is in the off-line state on the printing processing program, and the determination is satisfied. Then, in the subsequent connection determining, it is determined whether or not the specific printing apparatus is connected to the operation terminal as the storage device. If the specific printing apparatus is in the storage device mode as the result of the above, the determination is satisfied. Then, when the determination is satisfied, the mode switching signal is outputted to the printing apparatus in a switching outputting. As a result, the printing apparatus having been in the storage device mode as above is switched to the printing device mode.

As described above, the ordinary user can switch the printing apparatus to the printing device mode (without performing a mode switching operation or the like in the printing apparatus main body) only by executing the printing processing program after connecting the operation terminal to the printing apparatus in the storage device mode, whereby the print formation in the desired aspect can be performed with high accuracy. Moreover, since the printing apparatus is basically in the storage device mode as described above, the casual user can perform print formation casually and rapidly with a simple operation as described above by using the printing apparatus still in the storage device mode. As a result, the same printing apparatus can be smoothly shared by the ordinary user and the casual user.

BRIEF DESCRIPTION OF THE DRAWING

FIG. 1 is a system configuration view illustrating a label producing system including an operation terminal to which a printing processing program of an embodiment of the present disclosure is applied and a label printer controlled by the operation terminal.

FIG. 2 is a perspective view illustrating an appearance of the label printer.

FIG. 3 is a perspective view illustrating a state in which a roll sheet holder is attached to the label printer with an opening/closing cover open.

FIG. 4 is a plan view illustrating a state in which the opening/closing cover of the label printer is open.

FIG. 5 is a perspective view illustrating a state in which the opening/closing cover of the label printer is open.

FIG. 6 is a side sectional view illustrating a state in which the roll sheet holder is attached to the label printer.

FIG. 7 is a functional block diagram illustrating a control system of an external terminal and the label printer.

FIG. 8 is a schematic view illustrating a storage region of a FLASH ROM.

FIG. 9 is a schematic view illustrating a storage region of an SRAM.

FIG. 10 is a functional block diagram illustrating a flow of data between the label printer and the operation terminal.

FIG. 11 is an explanatory view illustrating a label editing screen displayed on a display part of the operation terminal when a full-editor is started while the label printer is still in a storage device mode.

FIG. 12 is an explanatory view illustrating a mode temporary switching alarm display displayed on the label editing screen.

FIG. 13 is an explanatory view illustrating a state in which the label printer has been temporarily switched to a printing device mode, and an editing operation has been received by a tape width of an acquired roll sheet.

FIG. 14 is an explanatory view illustrating a state in which print data is transmitted after editing is completed.

FIG. 15 is a flowchart illustrating a control step executed by a CPU of the operation terminal.

FIG. 16 is a flowchart illustrating the control step executed by a CPU of the label printer.

FIG. 17 is an explanatory view illustrating a state in which the full-editor is started, and the editing operation is received on the label editing screen while the label printer is still in the storage device mode in a variation in which a mode switching signal is outputted, triggered by a printing instruction.

FIG. 18 is an explanatory view illustrating the mode temporary switching alarm display displayed on the label editing screen after the editing is completed.

FIG. 19 is an explanatory view illustrating a state in which the label printer has been temporarily switched to the printing device mode, and the print data is transmitted.

FIG. 20 is a flowchart illustrating the control step executed by the CPU of the operation terminal.

DETAILED DESCRIPTION OF THE PREFERRED EMBODIMENTS

An embodiment of the present disclosure will be described below by referring to the attached drawings.

FIG. 1 is a system configuration view illustrating a label producing system including an operation terminal to which a printing processing program of the embodiment of the present disclosure is applied and a label printer controlled by the operation terminal.

<System Outline Configuration>

In FIG. 1, a label producing system LS includes a label printer 1 capable of producing a print label (not shown) on which a desired print is applied and an operation terminal 400 for operating the above described label printer 1, and they are connected to each other by an USB (Universal Serial Bus) cable 9.

The operation terminal 400 is a general-purpose personal computer generally sold in the market, for example, and includes a display part 401 such as a liquid crystal display and an operation part 402 such as a keyboard and a mouse. Moreover, a host-side socket (not shown) to which a first connector 9H of an end portion of the above described USB cable 9 is detachably attached is disposed on an appropriate area (on a rear surface portion, for example) of the operation terminal 400.

On a rear surface of the label printer 1, a target-side socket 11 (see FIG. 5 which will be described later) to which a second connector 9T on an end portion on a side opposite to the above described first connector 9H of the above described USB cable 9 is detachably attached is disposed.

The USB cable 9 includes the above described first connector 9H (a USB connector which is a so-called series-A plug, for example) which allows a connected device to function as a host and the above described second connector 9T (a USB connector which is a so-called series-B plug, for example) which allows the connected device to function as a target (see each of enlarged views in FIG. 1). The USB cable 9 has the second connector 9T attached (connected) to the target-side socket 11 of the above described label printer 1 and the first connector 9H attached to the host-side socket of the above described operation terminal 400 in the example. Therefore, in a functional relationship between the label printer 1 and the operation terminal 400, the label printer 1 functions as a target device and the operation terminal 400 functions as a host device.

Subsequently, a configuration of the label printer 1 will be explained on the basis of FIGS. 2 to 6.

<Outline Structure of Label Printer 1>

As illustrated in FIGS. 2 to 6, the label printer 1 has a resin housing 2 constituting a framework of the apparatus 1 and including a roll sheet holder storage part 4 which stores a roll sheet holder 3 around which a roll sheet 3A (corresponding to a print-receiving medium) having a predetermined width is wound, and an opening/closing cover 5 made of a transparent resin and attached in a freely openable/closable manner to a rear-side upper end edge portion so as to cover an upper side of the sheet holder storage part 4 via a right-and-left pair of hinge portions 60 on the rear part side.

The roll sheet 3A is made of a lengthy thermal sheet having self-coloring property (so-called thermal paper), a lengthy label sheet in which a separation sheet is bonded to one side of the thermal sheet with an adhesive and the like, and is wound around the roll sheet holder 3.

The opening/closing cover 5 is supported by the housing 2 via the hinge portions 60 so as to be rotatable and opens or closes an opening part OP above the roll sheet holder storage part 4 by the rotation. The opening/closing cover 5 is configured in a substantially U-shape integrally with a left wall surface 5D disposed on the left side when facing a front cover 6, a right wall surface 5C disposed on the right side, and an intermediate wall surface 5E extended so as to connect the left wall surface 5D and the right wall surface 5C to each other. Moreover, a top plate 5F is attached to the opening/closing cover 5 so as to cover an inner edge portion of the substantially U-shape.

Moreover, on the front cover 6 on a front side of the opening/closing cover 5, a sheet discharging exit 6A for discharging the printed roll sheet 3A to an outside is formed. Moreover, on a front surface portion on the upper side of the sheet discharging exit 6A, there are arranged substantially horizontally four buttons in total, which are, a power button 7A, a cut button 7B which is pressed down to drive a cutter unit 80 (see FIG. 6 which will be described later) disposed on an inner side of the sheet discharging exit 6A, and cut the roll sheet 3A to produce a print label (not shown), a feed button 7C for discharging the roll sheet 3A in a transport direction while being pressed down, and a switching button 7D which can be used in manually switching the driving mode (driving state) which will be described later. Furthermore, LED display parts 8, 8 which will be described later are arranged in the vicinity of the power button 7A and the switching button 7D on the front cover 6, respectively. Hereinafter, each of the buttons 7A, 7B, 7C, and 7D shall be simply referred to as the "buttons 7A, 7B, 7C, 7D" as appropriate.

The above described switching button 7D is used for selectively switching the driving mode of the label printer 1 by a manual operation as described above. The switching button 7D may be configured to be capable of switching under a condition of long pressing of the button for a predetermined long time to some degree (for several seconds, for example), so that the driving mode of the label printer 1 is not switched easily. As will be described later, in the embodiment, the driving mode of the label printer 1 is usually in the storage device mode. The switching button 7D has an appropriate light emitting display part inside which is lighted when the label printer 1 is in the storage device mode and is put out when the label printer 1 is in the printing device mode, for example. It may be so configured that the above described LED display part 8 performs display in different aspects (different colors, lighted display and flashing display and the like, for example) depending on whether the driving state is in the printing device state or in the storage device state when the driving state of the label printer 1 is switched as will be described later.

Moreover, as illustrated in FIGS. 4 and 5, an inlet 10 to which a power cord, not shown, is connected is disposed on the rear surface portion of the housing 2, and the above described target-side socket 11 into which the above described USB cable 9 can be inserted for connection to the above described operation terminal 400 or the like is disposed on a side (left side in FIG. 5) thereof.

<Details of Roll Sheet Holder Storage Part>

Moreover, as illustrated in FIGS. 3 and 4, a holder support member 23 is disposed on one of side end edge portions (right-side side end edge portion in FIG. 3) in a substantially perpendicular direction to the transport direction of the roll sheet holder storage part 4. A first positioning groove part 24 having a substantially vertically-long U-shape in a side view opened upward and opened on both sides in a width direction is formed in the holder support member 23, and a mounting member 21 projected in an outside direction on a positioning holding member 20 constituting the roll sheet holder 3 and having a substantially rectangular section can be fitted therein.

Moreover, a placing part 29 extended substantially horizontally from a rear end edge portion of an insertion port 26 (see FIG. 5 and FIG. 6 which will be described later) into which the roll sheet 3A is inserted to a front-side upper end edge portion of the roll sheet holder storage part 4 is disposed. Moreover, five second positioning groove parts 30A-30E each having a substantially L-shaped section corresponding to a plurality of width dimensions of the roll sheet 3A are formed on an end edge corner portion of the placing part 29 on a rear side in the transport direction. Each of the second positioning groove parts 30A-30E is formed so that a tip-end lower end portion to be brought into contact with the placing part 29 of a guide member 28 constituting the roll sheet holder 3 can be fitted in from above, as illustrated in FIG. 6.

Moreover, a positioning recess part 4A having a laterally long square shape in a planar view is formed having a predetermined depth on a bottom surface portion of the roll sheet holder storage part 4, substantially perpendicularly to the transport direction from an inner-side base end portion of the holder support member 23 to a facing side surface portion base end part. Moreover, a guide part 31 is formed on the side end edge portion of the insertion port 26 on the holder support member 23 side substantially to a rear end portion of the placing part 29 in the transport direction and guides the roll sheet 3A to the insertion port 26.

Moreover, as illustrated in FIG. 4, a discrimination recess part 4B having a rectangular shape in a planar view which is vertically long in the transport direction is formed on the inner-side base end portion of the holder support member 23 of the positioning recess part 4A. Five sheet discrimination sensors P1, P2, P3, P4 and P5 each including a push-type micro switch or the like and discriminating medium information such as a type, a material, a roll sheet width and the like of the roll sheet 3A are disposed in an L-shaped manner on the discrimination recess part 4B. Each of the sheet discrimination sensors P1-P5 is made of a known mechanical switch including a plunger and the micro switch or the like, and an upper end portion of each of the plungers is disposed so as to protrude from a bottom surface portion of the discrimination recess part 4B to the vicinity of a bottom surface portion of the positioning recess part 4A. Each of the sheet discrimination sensors P1-P5 detects whether or not there is each sensor hole (not shown) formed in a sheet discrimination portion extended in an inner-side direction substantially at a right angle to those sensors P1-P5 from a lower-end edge portion of the positioning holding member 20 and detects the type, material, roll sheet width and the like of the roll sheet 3A attached to the roll sheet holder 3 by its on/off signal.

<Internal Device Such as Thermal Head/Cutter Unit>

Moreover, as illustrated in FIG. 6, a platen roller 35 is pivotally supported rotatably on a depth side of the insertion port 26 in the roll sheet transport direction. Moreover, a thermal head 32 is fixed to an upper surface of a head support member 37 urged upward by a pressing spring 36. Moreover, an end edge portion on a rear side is supported swingably in a vertical direction by a rear surface portion of a frame 38 with respect to the transport direction of the head support member 37.

Moreover, a cutter unit 80 is disposed on a downstream side of the roll sheet 3A in the transport direction (left side in FIG. 6) from the platen roller 35 and the thermal head 32. The cutter unit 80 has a fixed blade 80A and a movable blade 80B as illustrated in the above described FIG. 6. When the above described cut button 7B is pressed down, the movable blade 80B is reciprocated in a vertical direction by a cutting motor 80C including a DC motor and the like. As a result, the roll sheet 3A after print by the above described thermal head 32 has been applied is cut by the fixed blade 80A and the movable blade 80B to a desired length, and a print label is produced and discharged from the sheet discharging exit 6A. The movable blade 80B is configured in a V-shape in a front view.

On the other hand, a control substrate 40 is disposed on a lower side of the roll sheet holder storage part 4 via a partition wall 39. On the control substrate 40, a control circuit part (see FIG. 7 which will be described later) is formed which drives and controls each of mechanism parts such as the thermal head 32 by an instruction from an external personal computer or the like, and each of the sheet discrimination sensors P1-P5 is electrically connected to the control substrate 40. Moreover, below the above described frame 38, a power substrate 41 in which a power circuit part is formed is disposed via the partition wall 39. The above described thermal head 32 is connected to a connector 44 disposed on a bottom surface side of the control substrate 40 by a flexible flat cable (FFC) 43. The control substrate 40 and the power substrate 41 are covered by a bottom surface cover 45 made of a thin steel plate and screwed to the bottom surface portion.

<Control System>

Subsequently, a control system of the operation terminal 400 and the label printer 1 with the above described configuration will be explained by using FIG. 7.

As illustrated in FIG. 7, the label printer 1 includes a CPU 231 controlling the entire apparatus, a FLASH ROM 234 which stores a control program and the like, is rewritable, and is a non-volatile storage element whose data is not erased even if power is turned off, an SRAM 233 which is a volatile storage element storing temporary data and the like generated when the CPU 231 executes the control program, and an EEPROM 235 which is a non-volatile storage element storing parameter information, history information and the like of the label printer 1. The CPU 231 is connected to the FLASH ROM 234, the SRAM 233, and the EEPROM 235 via a bus so that the CPU 231 can refer to the information stored in them.

Moreover, the label printer 1 includes an input/output interface 236. The input/output interface 236 is inserted between the CPU 231 and various devices connected to the CPU 231 (the buttons 7A-7D, and a drive circuit 243, a drive circuit 244, and a USB controller 242 which will be described later). Then, by executing voltage conversion processing between input/output signals, impedance conversion processing, timing adjustment processing and the like, signals outputted from the CPU 231 to the various devices are made recognizable by the various devices, and the signals transmitted from the various devices to the CPU 231 are made recognizable by the CPU 231.

Moreover, the label printer 1 includes the above described buttons 7A-7D. The buttons 7A-7D are electrically connected to the input/output interface 236 so that an operation content when the buttons 7A-7D are operated by the user can be recognized by the CPU 231.

Moreover, the label printer 1 includes the drive circuit 243 which can control the above described thermal head 32. The drive circuit 243 is electrically connected to the thermal head 32 so that print data is printed on a print label by controlling the thermal head 32. Moreover, the drive circuit 243 is electrically connected to the input/output interface 236 so that the drive circuit 243 can be controlled by the CPU 231.

Moreover, the label printer 1 includes the drive circuit 244 which can control the platen roller 35. The drive circuit 244 is electrically connected to the above described platen roller 35 so that the print label can be sent out by controlling the platen roller 35 when the print data is printed on the print label by the thermal head 32. Moreover, the drive circuit 244 is electrically connected to the input/output interface 236 so that the drive circuit 244 can be controlled by the CPU 231.

Moreover, the label printer 1 includes the USB controller 242. The USB controller 242 is a controller device for executing the voltage conversion processing and impedance conversion processing so that communication with the operation terminal 400 can be performed in a state connected to the operation terminal 400 through the above described USB cable 9. The USB controller 242 and the input/output interface 236 are electrically connected to each other so that a signal received from the operation terminal 400 through the USB cable 9 can be recognized by the CPU 231 or the signal transmitted from the CPU 231 can be transmitted to the operation terminal 400 through the USB cable 9.

The above described CPU 231, SRAM 233, FLASH ROM 234, EEPROM 235, drive circuits 243, 244, and USB controller 242 and the like are included in the above described control circuit part and are disposed on the above described control substrate 40.

Subsequently, an electrical configuration of the operation terminal 400 will be explained. The operation terminal 400 includes a CPU 410 controlling the entirety, a ROM 403 storing a BIOS program and the like read at start of the CPU 410, a hard disk drive (HDD) 406 storing an OS, an executable file of an application and the like, a RAM 404 which is a volatile storage element storing temporary data and the like required when the OS and the application are executed by the CPU 410 and the like. The CPU 410 is connected to the ROM 403, the RAM 404, and the HDD 406 via a bus 409, respectively, so that the CPU 410 can refer to information stored in them.

Moreover, the operation terminal 400 includes a display control part 407. The display control part 407 includes a RAM for display (not shown) storing display data and is electrically connected to the display part 401 via a video cable so that a control signal is transmitted to the display part 401 so as to display the display data. Moreover, the display control part 407 is electrically connected to the bus 409 so as to allow display control from the CPU 410.

Moreover, the operation terminal 400 includes a USB controller 408. The USB controller 408 is a controller device for executing the voltage conversion processing and impedance conversion processing so as to allow a peripheral device to communicate with the CPU 410 through the USB interface. In the example illustrated in FIG. 7, the above described operation part 402 and the label printer 1 are in a state connected to the USB controller 408. Moreover, the USB controller 408 and the bus 409 are electrically connected to each other so as to allow the CPU 410 to detect the operation content of the operation part 402 and allow communication between the label printer 1 and the CPU 410.

<Storage Region>

Subsequently, storage regions of the above described FLASH ROM 234 and the SRAM 233 which are storage elements included in the label printer 1 will be explained by referring to FIGS. 8 and 9.

The storage region of the FLASH ROM 234 will be explained by referring to FIG. 8. On the FLASH ROM 234, a control program region 251 is disposed. The control program region 251 stores a control program when the CPU 231 controls various devices so as to execute processing. The control program is read by the CPU 231 when the CPU 231 executes various types of processing. Moreover, on the control program region 251, an application program region 252, an USB device driver region 253, and other regions are disposed.

In the application program region 252 in the control program region 251, higher level control programs (file operation (writing, reading), determination on the basis of the file content, instructions to various driver programs and the like) in the control program executed by the CPU 231 are stored.

In the USB device driver region 253 in the control program region 251, the USB device driver executing communication protocol control through the USB cable 9 is stored. Specifically, a mass storage class driver and a printer class driver are stored as the USB device drivers. Any one of the USB device drivers is read and used as necessary by the CPU 231 when the label printer 1 communicates with the operation terminal 400 through the USB cable 9.

When the printer class driver is selected and used as the USB device driver by the CPU 231, the label printer 1 is recognized by the operation terminal 400 as the printing device. As a result, similarly to a using method of a prior-art general printing apparatus, printing can be applied to the print label by the label printer 1 by transmitting the print data to the label printer 1 from the operation terminal 400. Hereinafter, the driving mode recognized as the printing device will be referred to as a "printing device mode".

Moreover, when the mass storage class driver is selected and used as the USB device driver by the CPU 231, the label printer 1 is recognized by the operation terminal 400 as the storage device. As a result, a specific storage region (a disk region 254 in the FLASH ROM 234 which will be described later) in the label printer 1 can be used as a storage region of the operation terminal 400. Hereinafter, the driving mode recognized as the storage device will be referred to as a "storage device mode".

Moreover, the disk region 254 is disposed in the FLASH ROM 234. The disk region 254 is set so as to be usable as a storage region of the operation terminal 400 in a state in which the label printer 1 is recognized as a storage device by the operation terminal 400. The disk region 254 stores at least an editor lite executable file which is an executable file of a program (editor lite) for editing the print data (details of the editor lite will be described later). Moreover, a switching program executable file which is an executable file of a program for switching the driving mode of the label printer 1 is stored. Moreover, data being edited which is the print data in the middle of creation by the editor is stored.

Moreover, a local region 255 is disposed in the FLASH ROM 234. The local region 255 is set so as not to be seen from the operation terminal 400 unlike the disk region 254. The local region 255 stores parameter data and the like of the program.

Subsequently, the storage region of the SRAM 233 will be explained by referring to FIG. 9. A printing buffer region 261 temporarily storing print data when print is to be applied on a print label is disposed in the SRAM 233. Moreover, a flag region 262 for storing flag information is disposed. Moreover, other storage regions are disposed.

Subsequently, the storage regions of the HDD 406 and the RAM 404 included in the operation terminal 400 will be explained. The HDD 406 stores a full-editor executable file which is an executable file of a program for editing the print data (full-editor; a program for executing flowcharts in FIGS. 15, 16, and 20 which will be described later), not shown. Moreover, the RAM 404 stores data being edited which is the print data in the middle of creation by the editor, not shown.

<Editor Lite and Full-Editor>

Subsequently, a difference between the editor lite executable file stored in the disk region 254 of the FLASH ROM 234 of the label printer 1 and the full-editor executable file stored in the HDD 406 of the operation terminal 400 will be explained. Both are programs for creating the print data required when printing processing is executed in the label printer 1 and executable files of the programs executable in the operation terminal 400. By starting these executable programs in the operation terminal 400, a user can create the print data based on the editor program displayed on the display part 401. Then, the print based on the created print data is formed by the thermal head 32 of the label printer 1.

Here, in the editor lite and the full-editor, a printing condition (font, size of characters, character effect and the like) can be edited and created in addition to character information. Therefore, the created print data includes the printing condition (font, size of characters, character effect and the like) and the like in addition to the character information. Here, when the print data is to be created by using the full-editor, substantially all the printing conditions printable by the label printer 1 can be used. On the other hand, when the print data is to be created by using the editor lite, only a part of the printing conditions printable by the label printer 1 can be used. Thus, the data volume of the full-editor executable file is larger than the data volume of the editor lite executable file. Therefore, the full-editor executable file is stored in the HDD 406 of the operation terminal 400 having a large storage capacity, while the editor lite executable file is stored in the FLASH ROM 234 of the label printer 1 which cannot have a large storage capacity.

In the following, the printing condition included in the print data created by the editor lite (hereinafter referred to as a "first printing condition") and the printing condition included in the print data created by the full editor (hereinafter referred to as a "second printing condition") do not accord with each other, and it is assumed that the first printing condition includes the printing condition not included in the second printing condition, and the second printing condition includes the printing condition not included in the first printing condition.

Moreover, in order that the editor lite is used by the user in the operation terminal 400, the editor lite executable file should be transferred to the operation terminal 400 from the FLASH ROM 234 of the label printer 1 via the USB cable 9 and stored in the RAM 404 of the operation terminal 400. The editor lite can be started in a state in which the editor lite executable file is stored in the RAM 404 of the operation terminal 400 (details will be described later).

Moreover, the print data created by using the full-editor is transmitted to the label printer 1 in the state recognized as the printing device, and printing processing is executed in the label printer 1. Therefore, in order to transmit the print data to the label printer 1, a printer driver should be installed in advance so as to allow the print data to be transferred to the label printer 1. On the other hand, the print data created by using the editor lite is transferred to the label printer 1 in the state recognized as the storage device, and the printing processing is executed in the label printer 1 in a state directly stored in the disk region 254 of the FLASH ROM 234. Therefore, unlike the printing processing when the full editor is used, the printer driver for transmitting the print data to the label printer 1 is not required.

<Data Flow>

Subsequently, a flow of data in the label printer 1 when the CPU 231 in the label printer 1 communicates with the operation terminal 400 will be explained by referring to FIG. 10.

As illustrated in FIG. 10, the FLASH ROM 234 includes an application program 256 and a USB device driver 257 as control programs. Moreover, a printer class driver 258 and a mass storage class driver 259 are included as the USB device drivers 257. The USB device driver 257 is a program read and used by the CPU 231 in advance when the USB controller 242 is actually controlled, and communication is conducted with the operation terminal 400 via the USB cable 9.

The CPU 231 selects and reads out either one of the printer class driver 258 and the mass storage class driver 259 as the USB device driver and uses it so as to conduct communication with the operation terminal 400 via the USB cable 9. If the CPU 231 selects the mass storage class driver 259 as the USB device driver 257, the operation terminal 400 recognizes the label printer 1 as the storage device. As a result, in a state in which the operation terminal 400 is connected to the label printer 1 via the USB cable 9, the disk region 254 of the FLASH ROM 234 is made usable as the storage region of the operation terminal 400.

Moreover, if the CPU 231 selects the printer class driver 258 as the USB device driver 257, the operation terminal 400 recognizes the label printer 1 as the printing device. As a result, by transferring the print data from the operation terminal 400 to the label printer 1 and giving a printing instruction in a state in which the operation terminal 400 is connected to the label printer 1 via the USB cable 9, the printing processing can be executed by the label printer 1.

Then, the USB controller 242 is controlled on the basis of the USB device driver selected and read, whereby communication can be performed with the operation terminal 400 via the USB cable 9.

<Features of the Embodiment>

As described above, in the label printer 1 to be operated by the operation terminal 400, either one of the storage device mode and the printing device mode is selectively executed as the driving mode. If the driving mode is the printing device mode, the operation terminal 400 recognizes the label printer 1 as the printing device. In the case, the print data for forming the desired print by using the above described full-editor which is the application program for the printing device is created in the operation terminal 400, the print data is transferred to the label printer 1, and the print formation processing is executed. Therefore, the printing device mode is more convenient for a user (hereinafter referred to as an "ordinary user" as appropriate) who wants to execute print formation in a desired intended aspect with high accuracy even if the operation is somewhat complicated or cumbersome.

On the other hand, if the driving mode is the storage device mode, as described above, the operation terminal 400 recognizes the label printer 1 as the storage device. In the case, the above described editor lite executable file which is the executable file of the editing program of the print data stored in the label printer 1 can be easily used by the operation terminal 400 without installing the editing program of the print data as above in advance in the operation terminal 400. Particularly, since the various types of data can be easily stored in the label printer 1 by the operation terminal 400, the print processing can be executed by the label printer 1 by storing the print data directly in the above described disk region 254 of the label printer 1 without installing the printer driver in advance in the operation terminal 400 as described above. Therefore, the storage device mode is more convenient for a user (hereinafter referred to as a "casual user" as appropriate) who wants to form a print casually and rapidly with a simple operation even if a print aspect or an editing operation is somewhat limited.

Here, there can be an instance in which the above described ordinary user and the casual user share the same label printer 1 for use. In such a case, if the ordinary user (who usually uses the label printer 1 in the printing device mode) erroneously uses the above described full-editor in the label printer 1 in the storage device mode in order to create print data and perform print formation, for example, it is likely that print formation is not performed correctly. On the contrary, if the casual user (who usually uses the label printer 1 in the storage device mode) erroneously connects the label printer 1 in the printing device mode to the operation terminal 400, for example, plug-and-play of the label printer 1 is started, and it is likely that the casual user is confused.

Thus, in the embodiment, in order to avoid a trouble as above and to allow smooth sharing by the ordinary user and the casual user, on the premise that the label printer 1 is basically in the above described storage device mode, a function of switching the label printer 1 to the printing device mode is added to the above described full-editor (for controlling the label printer 1 in the above described printing device mode). More specifically, when the above described ordinary user connects the operation terminal 400 to the label printer 1 in the storage device mode in order to execute the printing processing, by performing a predetermined switching trigger operation (which will be described later) in a state in which the full-editor is started, the label printer 1 is temporarily switched to the above described printing device mode automatically by a switching signal from the operation terminal 400. Details of the control contents will be explained below by referring to FIGS. 11 to 14.

<Start of Full-Editor by Ordinary User>

FIG. 11 illustrates a label editing screen 70 displayed on the display part 401 when the above described full-editor is started in the operation terminal 400 by an appropriate operation of the above described ordinary user while the label printer 1 is still in the storage device mode.

As illustrated in FIG. 11, the label editing screen 70 includes a toolbar region 71 and a label editing region 72 for inputting print information such as characters. The toolbar region 71 has a "tape detection" button 71b for detecting medium information (in the example, tape width information of the roll sheet 3A) of the roll sheet 3A attached to the roll sheet holder 3 of the above described label printer 1, a medium information display column 71a displaying the medium information of the roll sheet 3A, a "print" button 71c for giving a printing instruction for forming a print of the print data on the roll sheet 3A to produce a print label to the label producing apparatus 1, a model name ("QL-700" in the example) of the label printer 1 to be used, and a mark 71*d* corresponding to the model name. At this time immediately after start of the full-editor (before various types of processing which will be described later are executed), the tape width "12 mm" which was set previously, for example, is displayed as default in the medium information display column 71*a*. Moreover, a label image frame G corresponding to the above described tape width 12 mm is displayed in the label editing region 72 corresponding to the default display.

When the above described ordinary user clicks the "tape detection" button 71*b* by an operation of the operation part 402 in such a state, as illustrated in FIG. 12, a mode temporary switching alarm display 73 is displayed in a form of interrupted window in the label editing region 72. In the example, the mode temporary switching alarm display 73 is a message which reads "Temporarily changed to mode in which printer can be used in full-editor. To change to mode for use in full-editor all the time, press switching button from editor lite." The "switching button" here is the switching button 7D of the above described label producing apparatus 1. If the "printing device mode" is to be used all the time without using the temporary switching function (temporary switching from the storage device mode to the printing device mode) of the editor of the embodiment which will be described below, it is only necessary to operate the above described switching button 7D.

When the ordinary user clicks an "OK" button 73*a* displayed in the mode temporary switching alarm display 73 by the operation of the operation part 402 in correspondence with the above described display, the label printer 1 is temporarily switched from the storage device mode so far (the full-editor can be used) to the above described printing device mode. As a result, the on-line state of the label printer 1 is confirmed/displayed (not shown) on the editing screen 70 of the full-editor having been started as illustrated. Subsequently, the medium information (the tape width information in the example) of the roll sheet 3A detected by the above described sheet discrimination sensors P1-P5 is acquired from the label printer 1 having entered the on-line state. As a result, as illustrated in FIG. 13, the tape width information thus acquired is displayed in the medium information display column 71*a*, and the label image frame G corresponding to the above described tape width thus acquired is newly displayed in the label editing region 72. In the example, the roll sheet 3A having the tape width of 24 mm is attached to the roll sheet holder 3, and the tape width "24 mm" thus acquired is displayed in the above described medium information display column 71*a*. The label image frame G enlarged to the above described tape width (24 mm) thus acquired is displayed in the label editing region 72, and the editing operation of the print label is received in the label image frame G. That is, the above described ordinary user can perform the editing operation by inputting a print object (text characters in the example) in a print input region G1 in the above described label image frame G by an appropriate operation input through the operation part 402.

Subsequently, when the input of the text character R (characters "UENO-TECH" in the example) in the above described print input region G1 is completed (the editing operation is completed) as illustrated in FIG. 14, and a desired label image M is completed, by clicking of the above described "print" button 71*c* by the ordinary user, the print data corresponding to the label image M is transmitted to the label printer 1. As a result, the print label on which the print of the above described text character R is formed is created in the label printer 1.

<Control Procedure in Operation Terminal>

In order to realize the above described method, a control procedure executed by the CPU 410 of the operation terminal 400 is illustrated in FIG. 15. A flow in FIG. 15 is started when the above described full-editor is executed in the operation terminal 400 connected to (however, in the off-line as will be described later) the label printer 1 in the above described storage device mode (which is the normal driving mode as described above).

In FIG. 15, first, at Step S5, the CPU 410 outputs a control signal to the display part 402 so as to have the label editing screen 70 displayed. Then, on the label editing screen 70, a selection operation of the label printer 1 to be operated (the above described model "QL-700" which is a model including the above described mode switching function in the example) by an appropriate operation of the ordinary user in the operation part 402 is received.

Subsequently, the routine proceeds to Step S10, and the CPU 410 outputs a control signal to the USB controller 408 and determines whether or not the above described label printer 1 connected to the operation terminal 400 is in the off-line state by a known method. If the above described label printer 1 is in the printing device mode, it is in the on-line state, and the determination is not satisfied (Step S10: NO), and the flow is finished. If the above described label printer 1 is in the storage device mode, the label printer 1 is in the off-line state on the editor, and the determination is satisfied (Step S10: YES), and the routine proceeds to Step S15.

At Step S15, the CPU 410 outputs a control signal to the USB controller 408 and determines whether or not there is a drive as a mass storage in the above described label printer 1. If there is no drive as a mass storage (that is, a volume of the storage region that can be used as the storage device) in the above described label printer 1, the determination is not satisfied (Step S15: NO), and the flow is finished. If there is a drive as a mass storage in the above described label printer 1, the determination is satisfied (Step S15: YES), and the routine proceeds to Step S20.

At Step S20, the CPU 410 outputs a control signal to the USB controller 408 and determines whether or not the above described label printer 1 satisfies a predetermined compatibility condition via the USB cable 9. As the predetermined compatibility condition at this time, conditions that a usable drive is a removable disk found at the above described Step S15, that the model of the label printer 1 selected at the above described Step S10 is a model corresponding to the temporary switching from the storage device mode (by the method of the embodiment), that an input port of the signal is a mode for USB connection and the like can be considered. If the above described label printer 1 does not satisfy even any one of the above compatibility conditions, the determination is not satisfied (Step S20: NO), and the flow is finished. If the above described label printer 1 satisfies all the above described compatibility conditions, the determination is satisfied (Step S20: YES), and the routine proceeds to Step S25.

At Step S25, the CPU 410 determines whether or not the "tape detection" button 71*b* displayed on the above described label editing screen 70 has been clicked/operated by an appropriate operation of the ordinary user in the operation part 402. The determination is not satisfied until the "tape detection" button 71*b* is operated (Step S25: NO), and the routine stands by in a loop. If the "tape detection" button 71*b* is clicked/operated (see FIG. 11), the determination is satisfied (Step S25: YES), and the routine proceeds to Step S30.

At Step S30, the CPU 410 outputs a control signal to the display part 402 and has the mode alarm display 73 (see FIG. 12) made of the above described message that "Temporarily changed to mode in which printer can be used in full-editor. To change to mode for use in full-editor all the time, press switching button from editor lite." displayed on the label editing screen 72 on the display part 402. When the Step S30 is finished, the routine proceeds to Step S35.

At Step S35, the CPU 410 determines whether or not the "OK" button 73a displayed in the mode alarm display 73 has been clicked by an appropriate operation of the ordinary user in the operation part 402. The determination is not satisfied until the "OK" button 73a is clicked/operated (Step S35: NO), and the routine stands by in a loop. If the "OK" button 73a is clicked/operated, the determination is satisfied (Step S35: YES), and the routine proceeds to Step S40.

At Step S40, the CPU 410 outputs a control signal to the USB controller 406 and outputs a printing device mode switching signal to the label printer 1 via the USB cable 9. As a result, a printing device mode switching command is written in a predetermined storage region (the above described SRAM 233, for example) determined in advance in the label printer 1, and when the CPU 231 of the label printer 1 reads out the above described written command at a subsequent appropriate timing, the label printer 1 is temporarily switched from the above described storage device mode to the printing device mode. When Step S40 is finished, the routine proceeds to Step S45.

At Step S45, the CPU 410 outputs a control signal to the USB controller 408 and determines whether or not the above described label printer 1 connected to the operation terminal 400 has entered the on-line state (whether or not the on-line state has been confirmed) by the known method. If the driving mode of the label printer 1 has been switched to the printing device mode by the output of the printing device mode switching signal at the above described Step S40, it is confirmed that the label printer 1 has entered the on-line state on the basis of receipt of an appropriate response signal. The determination is not satisfied until the on-line state is confirmed (Step S45: NO), and the routine stands by in a loop. If the on-line state is confirmed, the determination is satisfied (Step S45: YES), and the routine proceeds to Step S50.

At Step S50, the CPU 410 outputs a control signal to the USB controller 408 and acquires the above described medium information (tape width information in the example) of the roll sheet 3A attached to the roll sheet holder 3 of the label printer 1 and detected by the sheet discrimination sensors P1-P5 via the USB cable 9 (see FIG. 13). When Step S50 is finished, the routine proceeds to Step S55.

At Step S55, the CPU 410 receives an editing operation of the ordinary user (an operation input of the text character R and the like into the print input region G1 of the above described label editing region 72) by an appropriate operation of the operation part 402 in response to the switching of the label printer 1 to the printing device mode and entering into the on-line state as above (see FIGS. 13 and 14). When Step S55 is finished, the routine proceeds to Step S60.

At Step S60, the CPU 410 creates the print data corresponding to the text character R and the like inputted by the editing operation received at the above described Step S55. When Step S60 is finished, the routine proceeds to Step S65.

At Step S65, the CPU 410 determines whether or not the "print" button 71c on the label editing screen 70 has been clicked by an appropriate operation of the ordinary user in the operation part 402. The determination is not satisfied until the "print" button 71c is clicked/operated (Step S65: NO), and the routine returns to Step S55, and the above described similar procedure is repeated. If the "print" button 71c is clicked/operated (see FIG. 14), the determination is satisfied (Step S65: YES), and the routine proceeds to Step S70.

At Step S70, the CPU 410 outputs a control signal to the USB controller 408 and transmits the print data created at the above described Step S60 to the printer 1 via the USB cable 9. Subsequently, the flow is finished.

<Control Procedure in Label Printer>

A control procedure executed by the CPU 231 of the label printer 1 is illustrated in FIG. 16 corresponding to the execution of the control procedure by the above described CPU 410 of the operation terminal 400. A flow in FIG. 16 is started when the power button 7A of the label producing apparatus 1 is turned ON, for example. At start of the flow, as described above, the driving mode of the label printer 1 is in the above described storage device mode in advance by an operation of the switching button 7D or the like.

In FIG. 16, first, at Step S100, the CPU 231 determines whether or not the above described printing device mode switching signal has been inputted from the operation terminal 400 (see Step S40 in the above described FIG. 15). In more detail, the CPU 231 determines whether or not the above described printing device mode switching command written in the above described SRAM 233 was able to be read. The determination is not satisfied until the printing device mode switching signal is inputted (Step S100: NO), and the routine proceeds to Step S120 which will be described later. If the above described printing device mode switching signal has been inputted, the determination is satisfied (Step S100: YES), and the routine proceeds to Step S120.

At Step S110, the CPU 231 starts the switching program executable file stored in the disk region 254 of the FLASH ROM 234 and reversely switches the driving mode of the label printer 1 from the above described storage device mode to the printer device mode. When Step S110 is finished, the routine proceeds to Step S120.

At Step S120, the CPU 231 determines whether or not the power button 7A of the label printer 1 has been turned OFF. The determination is not satisfied until the ordinary user performs an OFF operation of the power button 7A (Step S120: NO), and the routine returns to the above described Step S100 and the similar procedure is repeated. If the ordinary user has pressed down the power button 7A so as to perform the OFF operation, the determination is satisfied (Step S120: YES), and the routine proceeds to Step S130.

At Step S130, the CPU 231 starts the switching program executable file stored in the disk region 254 of hate FLASH ROM 234 and switches the driving mode of the label printer 1 from the printer device mode to the original storage device mode. Subsequently, the flow is finished.

<Effect of Embodiment>

As described above, in the label printer 1 in the embodiment, either one of the storage device mode and the printing device mode is selectively executed as the driving mode. At this time, there can be an instance in which the above described ordinary user who wants to execute print formation with high accuracy in the printing device mode and the casual user who wants to perform print formation casually and rapidly with a simple operation share the same label printer 1 for use. In order that the ordinary user and the casual user can smoothly share the label printer 1 in such a case, too, in the embodiment, on the premise that the label printer 1 is basically in the storage device mode, a function of switching the label printer 1 from the storage device mode to the printing device mode is added to the full-editor.

That is, as described above, in a state in which the full-editor is executed, first, the selection of the label printer 1 is received (see Step S5 in FIG. 15) and then, it is determined whether or not the label printer 1 is in the off-line state (see Step S10). If the label printer 1 is in the storage device mode as described above, the label printer 1 is in the off-line state on the full-editor and thus, the above described determination is satisfied, and subsequently, it is determined whether or not the label printer 1 is connected as the storage device to the operation terminal 400 (see Step S15). When the determination is satisfied, the above described printing device mode switching signal for switching the storage device mode to the printing device mode is outputted to the above described label printer 1 (see Step S40). As a result, the label printer 1 having been in the storage device mode as above is switched to the printing device mode.

As described above, the above described ordinary user can switch the label printer 1 to the above described printing device mode (without manually operating the above described switching button 7D) only by executing the control procedure illustrated in the above described FIG. 15 by the full-editor after connecting the operation terminal to the label printer 1 in the storage device mode, whereby the print formation in the desired aspect can be executed with high accuracy. Moreover, the above described casual user can perform print formation casually and rapidly with a simple operation as described above by using the label printer 1 still in the storage device mode since the label printer 1 is basically in the storage device mode as described above. As a result, the same label printer 1 can be smoothly shared by the ordinary user and the casual user.

Moreover, particularly in the embodiment, when the above described specific label printer 1 is determined to be connected as the storage device to the operation terminal 400 and also when the predetermined switching trigger operation (pressing down of the "tape detection" button 71b in the above described example) is received, the above described printing device mode switching signal is outputted to the label printer 1. As a result, switching to the printing device mode reflecting the intension of the ordinary user can be reliably executed in accordance with receipt of the switching trigger operation. Moreover, the driving mode of the label printer 1 returns to the original mode before the switching by turning OFF the power button 7A (see Step S130 in FIG. 16. That is, the switching to the above described printing device mode is temporary). As a result, even if the casual user starts using the label printer 1 in the state after the switching to the printing device mode as above, the label printer 1 can be returned to the storage device mode by turning OFF power once and thus, print formation can be performed smoothly.

Moreover, particularly in the embodiment, when a detection instruction of the medium information of the roll sheet 3A attached to the roll sheet holder 3 is received as the above described switching trigger operation, the above described printing device mode switching signal is outputted. As a result, after starting the editor, the ordinary user can reliably execute temporary switching to the printing device mode only by clicking the "tape detection" button 71b on the editing screen 70.

Moreover, particularly in the embodiment, it is determined whether or not the label printer 1 has entered the on-line state after the output of the above described printing device mode switching signal (see Step S45 in FIG. 15), and after the on-line state is confirmed, the above described medium information is acquired (see Step S50). As a result, nonconformity that, though the medium information detection instruction was given by the clicking operation on the "tape detection" button 71b at Step S25, the label printer 1 has not entered the on-line state (that is, the label printer has not switched to the printing device mode), and acquiring of the medium information fails can be reliably avoided.

Moreover, particularly in the embodiment, the mode alarm display 73 prompting confirmation of whether or not to output the above described printing device mode switching signal. As a result, the ordinary user can reliably recognize that the temporary switching to the printing device mode is performed.

The present disclosure is not limited to the above described embodiment but is capable of various variations within a range not departing from the gist and technical idea thereof. The variations will be described below in order. The same reference numerals are given to the portions equal to those in the above described embodiment, and the explanation will be omitted or simplified as appropriate.

(1) When mode switching signal is outputted upon receipt of printing instruction:

In the above described embodiment, when a detection instruction of the medium information of the roll sheet 3A attached to the roll sheet holder 3 of the label printer 1 (in other words, the clicking operation on the "tape detection" button 71b) is received as the switching trigger operation, the above described printing device mode switching signal is outputted to the label printer 1, but this is not limiting. That is, by using a print formation instruction to the above described attached roll sheet 3A as the switching trigger operation, the above described printing device mode switching signal may be outputted to the label printer 1, triggered by the receipt of the print formation instruction. Details of a control content in such variation will be explained by referring to FIGS. 17 to 19.

<Start of Full-Editor by Ordinary User>

FIG. 17 illustrates a state in which the above described full-editor is started in the operation terminal 400 by an appropriate operation of the above described ordinary user while the label printer 1 is still in the storage device mode in the variation. At this time, in the variation, the fact that the roll sheet 3A having the tape width of 24 mm is attached to the roll sheet holder 3 is known in advance, and the tape width "24 mm" is displayed in the above described medium information display column 71a by an appropriate operation of the ordinary user through the operation part 402, for example. The label image frame G corresponding to the above described tape width (24 mm) is displayed in the label editing region 72, and the editing operation of the print label is received in the label image frame G. That is, the above described ordinary user inputs a print object (a text character of "UENO-TECH" in the example) in a print input region G1 in the above described label image frame G by an appropriate operation input through the operation part 402 and performs the editing operation.

As described above, when the input of the text character R in the print input region G1 is completed (editing operation is completed), the desired label image M is completed, and the ordinary user clicks the above described "print" button 71c as illustrated in FIG. 18, the mode temporary switching alarm display 73 is displayed in the label editing region 72 similarly to FIG. 12 of the above described embodiment.

When the ordinary user clicks the "OK" button 73a displayed in the mode temporary switching alarm display 73 by the operation of the operation part 402 as illustrated in FIG. 19 in correspondence with the above described display, the label printer 1 is temporarily switched from the storage device mode so far to the above described printing device mode (capable of using the full-editor) similarly to the above described embodiment. As a result, after the on-line state of the label printer 1 is confirmed/displayed (not shown) on the full-editor editing screen 70, the print data corresponding to the above described label image M is transmitted to the label printer 1. As a result, the print label on which the print of the above described text character R is formed is created in the label printer 1.

<Control Procedure at Operation Terminal>

In order to realize the above described method, a control procedure executed by the CPU 410 of the operation terminal 400 in the variation is illustrated in FIG. 20. A flow in FIG. 20 is different from the flow in FIG. 15 in a point that Step S25 and Step S50 are omitted, and Step S55-Step S65 are moved to between Step S20 and Step S30.

In FIG. 20, Step S5-Step S20 are similar to those in the above described FIG. 15. That is, after the label editing screen 70 is displayed on the display part 402 at Step S5, the off-line state of the label printer 1 is confirmed at Step S10, and the drive as the mass storage is confirmed at Step S15. Then, at Step S20, if the label printer 1 satisfies the above described predetermined compatibility condition, the determination is satisfied (Step S20: YES), and the routine proceeds to Step S55.

Processing contents at Step S55, Step S60, and Step S65 are similar to those in FIG. 15. That is, the CPU 410 receives the editing operation of the ordinary user by an appropriate operation in the operation part 402 (see FIG. 17. However, the label printer 1 is still in the off-line state at this point of time), and at Step S60, the corresponding print data is created. When the determination at Step S65 is satisfied by the clicking operation of the "print" button 71c (Step S65: YES), the routine proceeds to Step S30.

Processing contents at Step S30-Step S45 are similar to those in FIG. 15. That is, the mode alarm display 73 (see FIG. 12) is displayed on the label editing screen 72 at Step S30 (see FIG. 18), the determination at Step S35 is satisfied (S35: YES) by clicking on the "OK" button 73a, and at Step S40, the printing device mode switching signal is outputted to the label printer 1.

Subsequently, the processing content at Step S45 is similar to that in FIG. 15, and if it is confirmed that the label printer 1 has been switched to the printing device mode by the output of the above described printing device mode switching signal and has entered the on-line state, the determination is satisfied (Step S45: YES), and the routine proceeds to Step S70. The processing content of Step S70 is similar to that in FIG. 15, and the CPU 410 transmits the print data created at the above described Step S60 (before the label printer 1 enters the on-line state at the above described Step S45) to the printer 1 via the USB cable 9. Subsequently, the flow is finished.

In the variation configured as above, the above described printing device mode switching signal is outputted (see Step S30), triggered by the receipt of the print formation instruction to the roll sheet 3A as the above described switching trigger operation (in other words, clicking on the "print" button 71c). As a result, the above described ordinary user can reliably perform temporary switching to the printing device mode only by clicking the "print" button 71c on the editing screen 70 after starting the editor.

(2) Others:

The instance in which the present disclosure is applied to the print label producing apparatus for producing a print label by performing desired printing on a print-receiving tape as a printing apparatus is explained above as an example, but this is not limiting. That is, as an example of the printing apparatus, the present disclosure may be applied to a printer for forming an image or printing a character on an ordinary print-receiving sheet with sizes of A4, A3, B4, B5 or the like, for example, or to a portable printer driven by a battery power supply. The similar effect can be acquired in this case, too.

The arrows illustrated in FIGS. 7 and 10 indicate an example of the flow of the signal and do not limit a flow direction of the signal.

Sequences in the above described FIGS. 15, 16, and 17 do not limit the present disclosure to the procedures illustrated in the above described flows, but addition/deletion or a change of orders and the like of the procedures may be made within a range not departing from the gist and technical idea of the disclosure.

Moreover, other than those already described above, the above described embodiment and each of the variations may be combined as appropriate in use.

What is claimed is:

1. A non-transitory computer-readable recording medium storing a software driver for a printing apparatus, wherein the software driver comprises computer-readable instructions that, when executed by a processor, cause an operation terminal to perform the steps of:

receiving input corresponding to a selection of the printing apparatus to be operated, the printing apparatus being connected to the operation terminal;

starting a full version of a print editor;

in response to determining that the full version of the print editor has started, determining whether the printing apparatus connected to the operation terminal is in a storage device mode;

in response to determining that the printing apparatus connected to the operation terminal is in the storage device mode, outputting a mode switching signal to the printing apparatus, wherein the mode switching signal includes an instruction to the printing apparatus to temporarily switch from the storage device mode to a printing device mode different from the storage device mode;

receiving a switching trigger operation for outputting the mode switching signal;

determining whether the printing apparatus has entered an on-line state after the mode switching signal has been output;

in response to determining that the printing apparatus has entered the on-line state, acquiring medium information of a print-receiving medium attached to the printing apparatus;

in response to determining that the printing apparatus connected to the operation terminal is in the storage device mode, prompting a user to confirm output of the mode switching signal;

determining whether there is a drive of the printing apparatus that is useable as mass storage; and causing display of a mode switch alarm comprising a textual message indicating that the printing apparatus has temporarily changed to a mode in which the full version of the print editor can be utilized, wherein the outputting the mode switching signal to the printing apparatus includes outputting the mode switching signal in response to receiving the switching trigger operation;

the switching trigger operation includes input corresponding to a detection instruction to detect the medium information of the print-receiving medium attached to the printing apparatus; and the outputting the mode switching signal to the printing apparatus includes outputting the mode switching signal when the detection instruction is received, and the outputting the mode switching signal to the printing apparatus includes outputting the mode switching signal when the switching trigger operation is received in response to the prompting, and in the causing display of the mode switch alarm, said textual message is displayed onto a label image frame corresponding to a width of the print-receiving medium that is set as default.

2. A print processing system comprising:
a printing apparatus operably connected to an operation terminal and configured to print print data received from the operation terminal in both a storage device mode and a printing device mode different from the storage device mode, the printing apparatus comprising:
  a print-receiving medium; and
  a print head configured to print the print data on the print-receiving medium; and
non-transitory computer-readable recording medium storing a computer readable print processing program that, when executed by a processor, causes the operation terminal to perform the steps of:
  receiving input corresponding to a selection of the printing apparatus to be operated;
  starting a full version of a print editor;
  in response to determining that the full version of the print editor has started, determining whether the printing apparatus connected to the operation terminal is in the storage device mode;
  in response to determining that the printing apparatus connected to the operation terminal is in the storage device mode, outputting a mode switching signal to the printing apparatus, wherein the mode switching signal includes an instruction to the printing apparatus to temporarily switch from the storage device mode to the printing device mode;
  receiving a switching trigger operation for outputting the mode switching signal;
  determining whether the printing apparatus has entered an on-line state after the mode switching signal has been output;
  in response to determining that the printing apparatus has entered the on-line state, acquiring medium information of the print-receiving medium attached to the printing apparatus;
  in response to determining that the printing apparatus connected to the operation terminal is in the storage device mode, prompting a user to confirm output of the mode switching signal;
  determining whether there is a drive of the printing apparatus that is useable as mass storage; and
  causing display of a mode switch alarm comprising a textual message indicating that the printing apparatus has temporarily changed to a mode in which the full version of the print editor can be utilized, wherein
the outputting the mode switching signal to the printing apparatus includes outputting the mode switching signal in response to receiving the switching trigger operation;

the switching trigger operation includes input corresponding to a detection instruction to detect the medium information of the print-receiving medium attached to the printing apparatus;

the outputting the mode switching signal to the printing apparatus includes outputting the mode switching signal when the detection instruction is received; and the outputting the mode switching signal to the printing apparatus includes outputting the mode switching signal when the switching trigger operation is received in response to the prompting, and in the causing display of the mode switch alarm, said textual message is displayed onto a label image frame corresponding to a width of the print-receiving medium that is set as default.

3. The print processing system of claim 2, wherein:
the printing apparatus is configured to switch from the storage device mode to the printing device mode in response to receiving the mode switching signal, and
the printing apparatus is configured to switch from the printing device mode to the storage device mode in response to a power button of the printing apparatus being turned OFF.

4. The print processing system of claim 2,
wherein the full version of the print editor is configured to operate in conjunction with the printing apparatus when the printing apparatus is in the printing device mode to print the print data, and
wherein a light version of the print editor is configured to operate in conjunction with the printing apparatus when the printing apparatus is in the storage device mode to print the print data, wherein the light version of the print editor has fewer print conditions than the full version of the print editor.

5. A non-transitory computer-readable recording medium storing a software driver for a printing apparatus, wherein the software driver comprises computer-readable instructions that, when executed by a processor, cause an operation terminal to perform the steps of:
  receiving input corresponding to a selection of the printing apparatus to be operated, the printing apparatus being connected to the operation terminal;
  starting a full version of a print editor;
  in response to determining that the full version of the print editor has started, determining whether the printing apparatus connected to the operation terminal is in a storage device mode;
  in response to determining that the printing apparatus connected to the operation terminal is in the storage device mode, outputting a mode switching signal to the printing apparatus, wherein the mode switching signal includes an instruction to the printing apparatus to temporarily switch from the storage device mode to a printing device mode different from the storage device mode;
  receiving a switching trigger operation for outputting the mode switching signal;
  in response to determining that the printing apparatus connected to the operation terminal is in the storage device mode, prompting a user to confirm output of the mode switching signal;
  determining whether there is a drive of the printing apparatus that is useable as mass storage; and
  causing display of a mode switch alarm comprising a textual message indicating that the printing apparatus has temporarily changed to a mode in which the full version of the print editor can be utilized, wherein the outputting the mode switching signal to the printing apparatus includes outputting the mode switching signal in response to receiving the switching trigger operation;

the switching trigger operation includes input corresponding to a print instruction to print on a print-receiving medium attached to the printing apparatus; and the outputting the mode switching signal to the printing apparatus includes outputting the mode switching signal when the switching trigger operation is received in response to the prompting, and in the causing display of the mode switch alarm, said textual message is displayed onto a label image frame corresponding to a width of the print-receiving medium that is set as default.

6. A print processing system comprising:

a printing apparatus operably connected to an operation terminal and configured to print data received from the operation terminal in both a storage device mode and a printing device mode different from the storage device mode, the printing apparatus comprising:

a print-receiving medium; and a print head configured to print the print data on the print-receiving medium; and non-transitory computer-readable recording medium storing a computer readable print processing program that, when executed by a processor, causes the operation terminal to perform the steps of:

receiving input corresponding to a selection of the printing apparatus to be operated;

starting a full version of a print editor;

in response to determining that the full version of the print editor has started, determining whether the printing apparatus connected to the operation terminal is in the storage device mode;

in response to determining that the printing apparatus connected to the operation terminal is in the storage device mode, outputting a mode switching signal to the printing apparatus, wherein the mode switching signal includes an instruction to the printing apparatus to temporarily switch from the storage device mode to the printing device mode;

receiving a switching trigger operation for outputting the mode switching signal;

in response to determining that the printing apparatus connected to the operation terminal is in the storage device mode, prompting a user to confirm output of the mode switching signal;

determining whether there is a drive of the printing apparatus that is useable as mass storage; and causing display of a mode switch alarm comprising a textual message indicating that the printing apparatus has temporarily changed to a mode in which the full version of the print editor can be utilized, wherein the outputting the mode switching signal to the printing apparatus includes outputting the mode switching signal in response to receiving the switching trigger operation;

the switching trigger operation includes input corresponding to a print instruction to print on the print-receiving medium attached to the printing apparatus; and the outputting the mode switching signal to the printing apparatus includes outputting the mode switching signal when the switching trigger operation is received in response to the prompting, and in the causing display of the mode switch alarm, said textual message is displayed onto a label image frame corresponding to a width of the print-receiving medium that is set as default.

* * * * *